United States Patent
Royer

(10) Patent No.: US 6,595,594 B2
(45) Date of Patent: Jul. 22, 2003

(54) ASSEMBLY FOR COVERING OPEN TOP CONTAINERS

(76) Inventor: Real Royer, P.O. Box 1177, Ville-Marie, Quebec (CA), J0Z 3W0

( * ) Notice: Subject to any disclaimer, the term of this patent is extended or adjusted under 35 U.S.C. 154(b) by 0 days.

(21) Appl. No.: 10/217,629

(22) Filed: Aug. 12, 2002

(65) Prior Publication Data

US 2003/0052506 A1 Mar. 20, 2003

Related U.S. Application Data

(63) Continuation-in-part of application No. 09/878,368, filed on Jun. 12, 2001, now abandoned
(60) Provisional application No. 60/211,205, filed on Jun. 13, 2000.

(51) Int. Cl.$^7$ ............................................. B60J 11/00
(52) U.S. Cl. ...................................................... 298/98
(58) Field of Search ..................... 296/98, 105, 100.13, 296/100.1, 100.11, 100.15, 100.16, 100.12, 100.18

(56) References Cited

U.S. PATENT DOCUMENTS

| | | | | |
|---|---|---|---|---|
| 2,997,967 A | * | 8/1961 | Malapert ..................... | 296/98 |
| 3,768,540 A | * | 10/1973 | McSwain ..................... | 296/98 |
| 4,302,043 A | * | 11/1981 | Dimmer et al. ............... | 296/98 |
| 4,380,350 A | * | 4/1983 | Block .......................... | 296/98 |
| RE31,746 E | * | 11/1984 | Dimmer et al. ............... | 296/98 |
| 4,484,732 A | * | 11/1984 | Gould ........................ | 267/64.14 |
| 4,484,777 A | * | 11/1984 | Michel ......................... | 296/98 |
| 4,909,563 A | * | 3/1990 | Smith ........................... | 296/98 |
| 4,991,901 A | * | 2/1991 | Meekhof et al. ............... | 296/98 |
| 5,002,328 A | * | 3/1991 | Michel ......................... | 296/98 |
| 5,026,109 A | * | 6/1991 | Merlot, Jr. .................. | 296/105 |
| 5,050,923 A | * | 9/1991 | Petelka ......................... | 296/98 |
| 5,179,991 A | * | 1/1993 | Haddad, Jr. .................. | 296/98 |
| 5,180,203 A | * | 1/1993 | Goudy ......................... | 296/98 |
| 5,253,914 A | * | 10/1993 | Biancale ..................... | 296/105 |
| 5,690,377 A | * | 11/1997 | Denyer .................. | 296/100.15 |
| 5,692,793 A | * | 12/1997 | Wilson et al. .......... | 296/100.15 |
| 5,697,663 A | * | 12/1997 | Chenowth ..................... | 296/98 |
| 5,765,901 A | * | 6/1998 | Wilkens ....................... | 296/98 |
| 5,911,467 A | * | 6/1999 | Evans et al. .................. | 296/98 |
| 5,924,758 A | * | 7/1999 | Dimmer et al. ............... | 296/98 |
| 5,938,270 A | * | 8/1999 | Swanson et al. ....... | 296/100.13 |
| 6,142,554 A | * | 11/2000 | Carroll et al. ......... | 296/100.13 |
| 6,193,299 B1 | * | 2/2001 | Than ..................... | 296/100.15 |
| 6,234,562 B1 | * | 5/2001 | Henning ...................... | 296/98 |
| 6,435,595 B1 | * | 8/2002 | Chenowth ............. | 296/100.13 |
| 6,435,599 B2 | * | 8/2002 | Than ........................... | 296/98 |
| 6,478,361 B1 | * | 11/2002 | Wood .......................... | 296/98 |

\* cited by examiner

Primary Examiner—Kiran Patel
(74) Attorney, Agent, or Firm—Eric Fincham

(57) ABSTRACT

An assembly for selectively rolling and unrolling a tarpaulin so as to correspondingly uncover and tautly cover a top opening of an open-topped container. The assembly includes a rolling rod secured to the tarpaulin adjacent 5 an edge thereof. The rolling rod is operatively mounted over the top opening to roll up the tarpaulin therearound so as to uncover the top opening when rotated about the rod longitudinal axis towards a first container side wall in a first rod rotational direction. The rolling rod being also operatively mounted over the top opening to unroll the tarpaulin so as to cover the top opening when rotated about the rod longitudinal axis towards the second container side wall in a second rod rotational direction. The assembly also includes a winch drum attached to the rolling rod adjacent one of the rod longitudinal ends so as to rotate solidarly therewith. The assembly further includes a tensioning cable having a first end thereof attached to the winch drum thus allowing the tensioning cable to be wound around the winch drum when the rolling rod is rotated in the second rod rotational direction and also allowing the tensioning cable to be unwounded from the winch drum when the rolling rod is rotated in the first rod rotational direction. A cable tensioning mechanism is attached to the tensioning cable second end for resiliently maintaining the tensioning cable in a taut state.

18 Claims, 16 Drawing Sheets

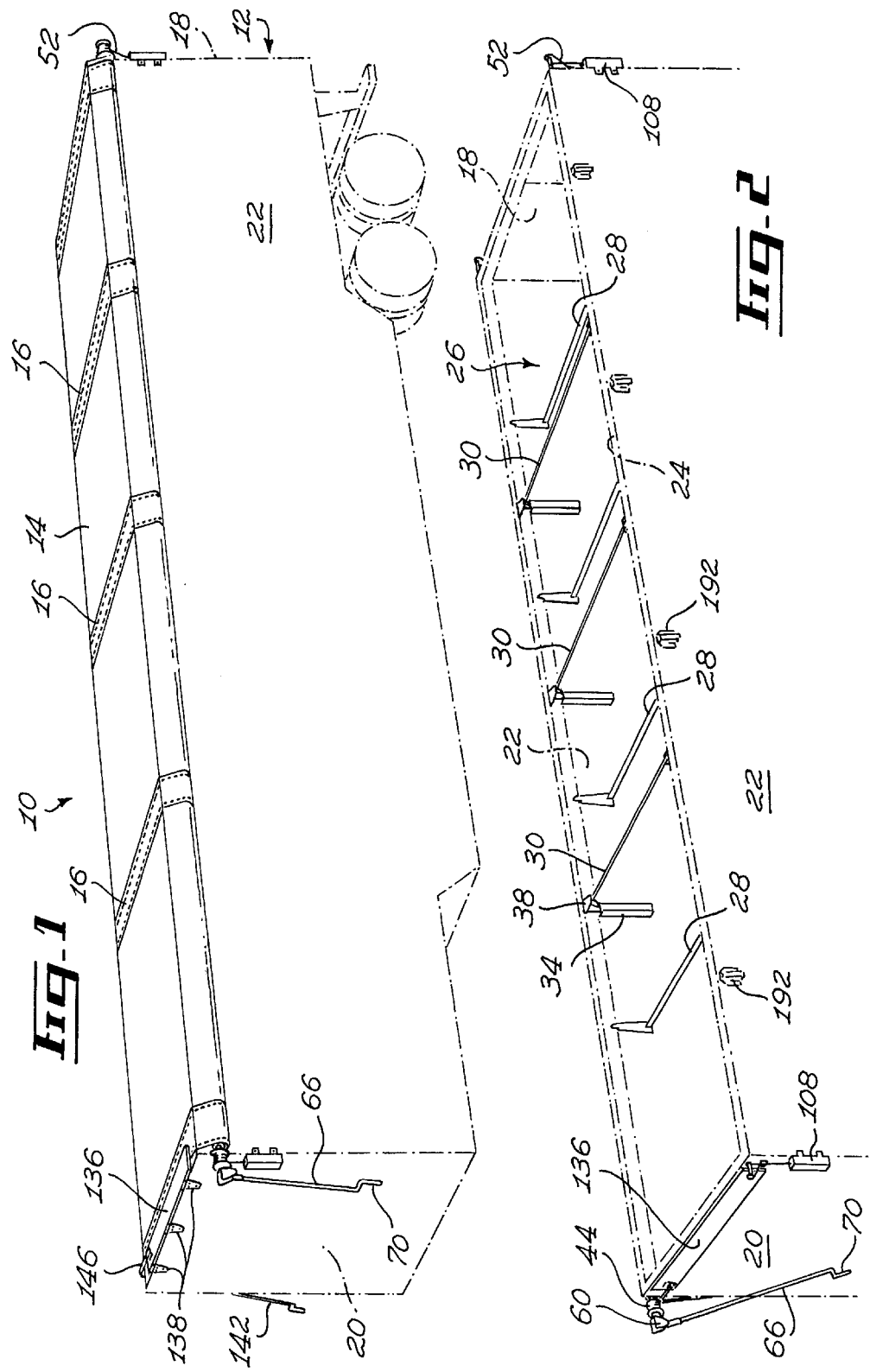

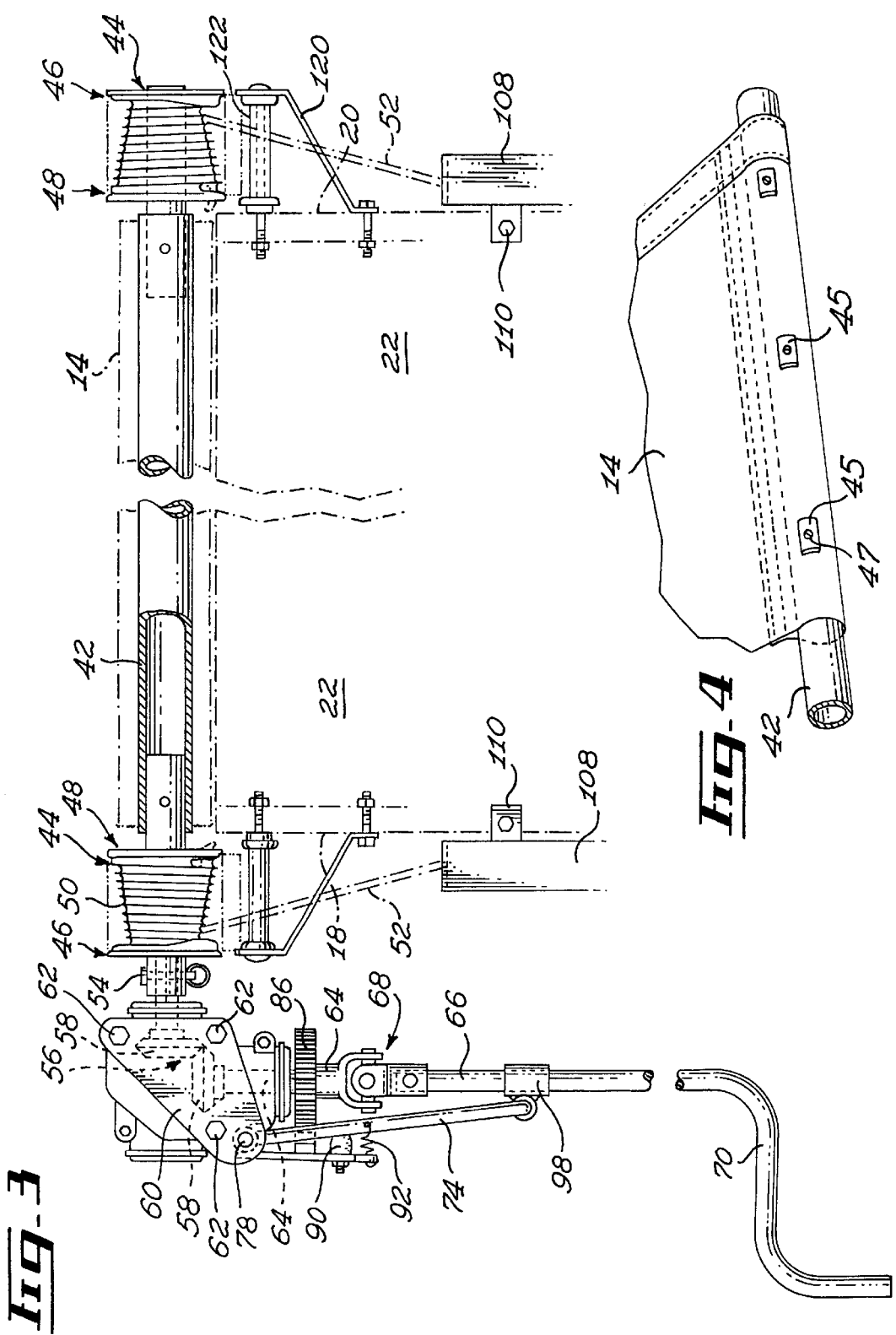

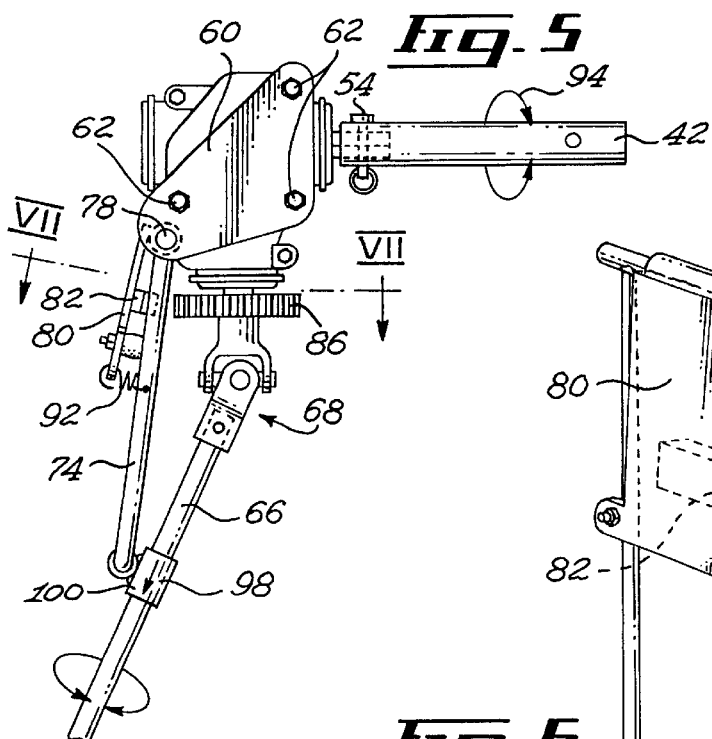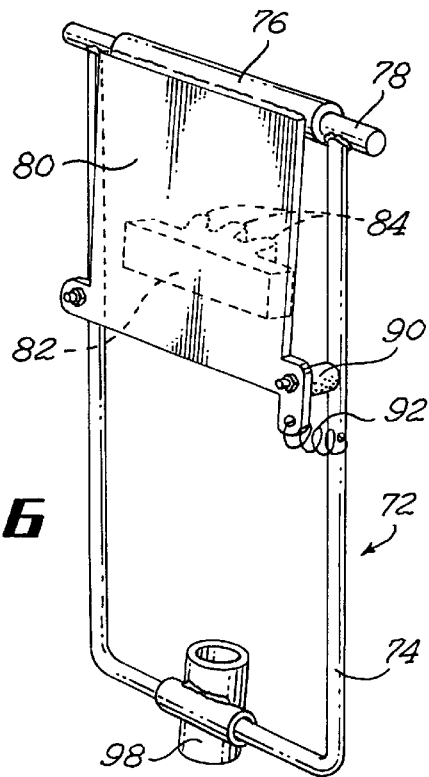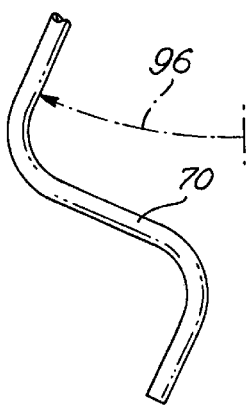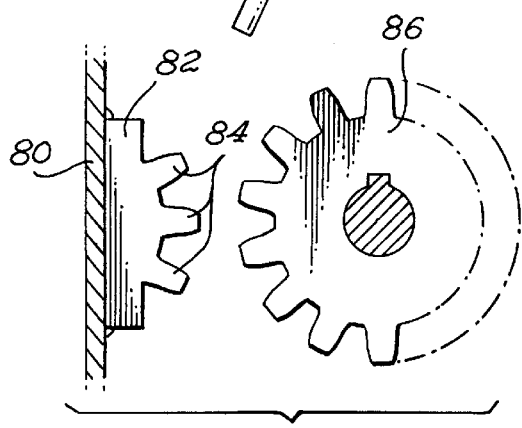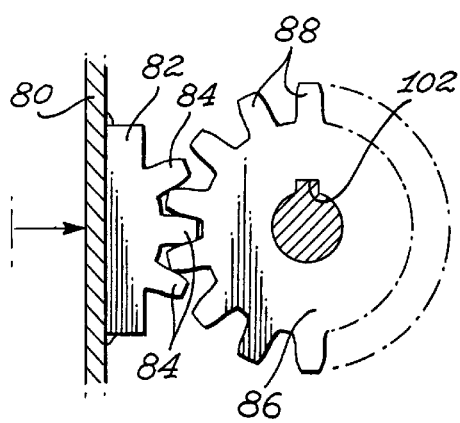

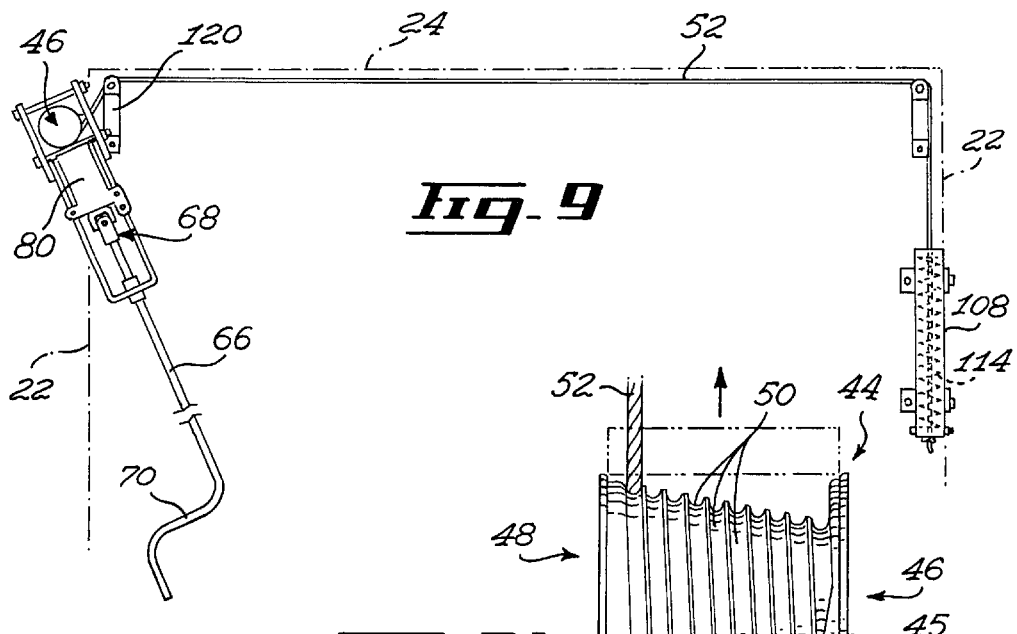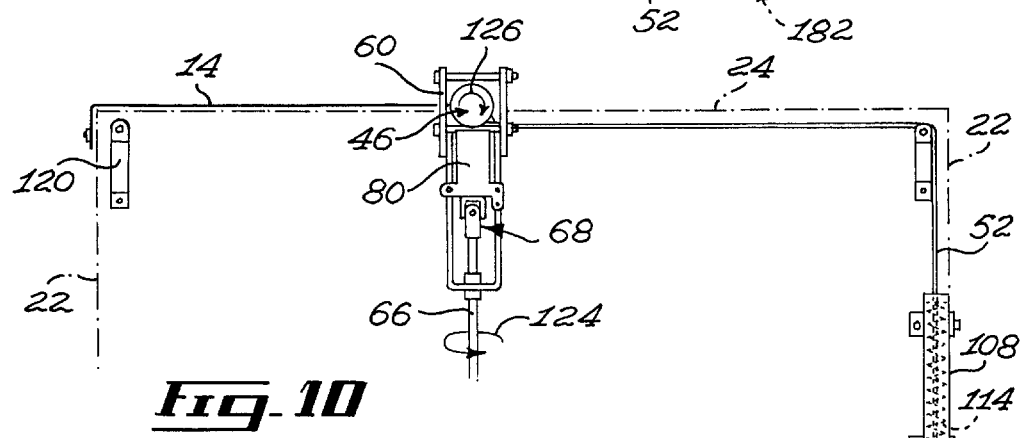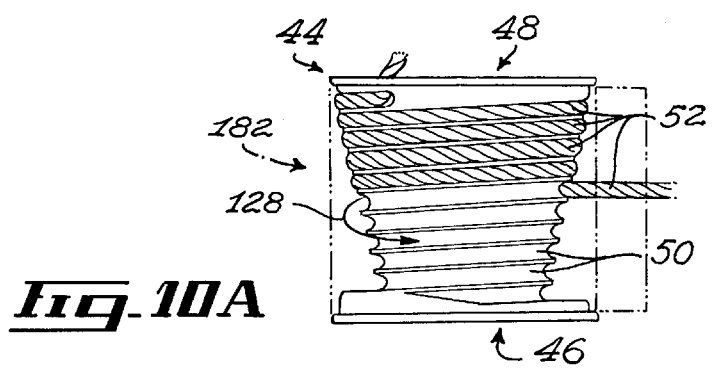

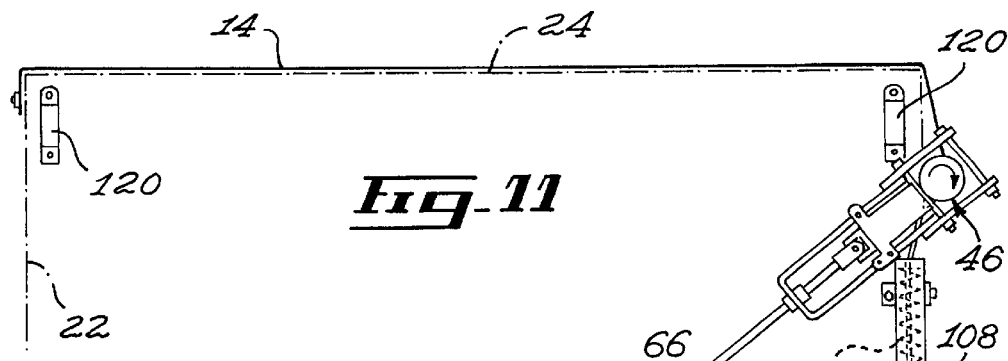
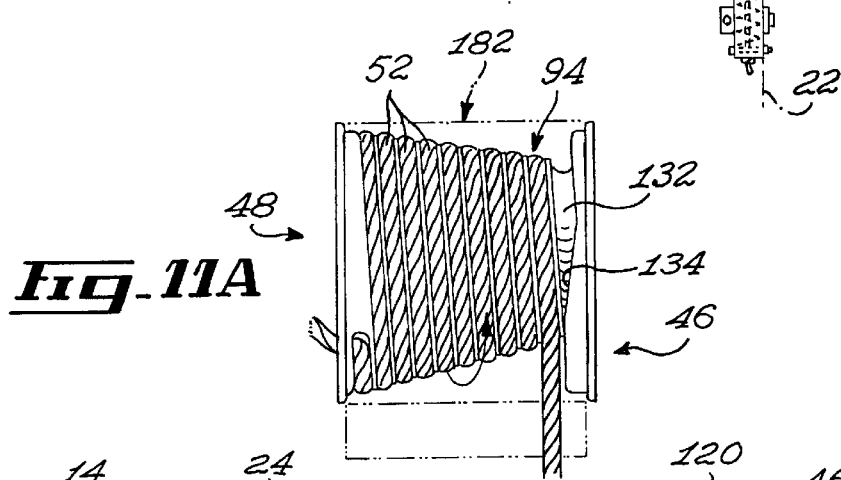
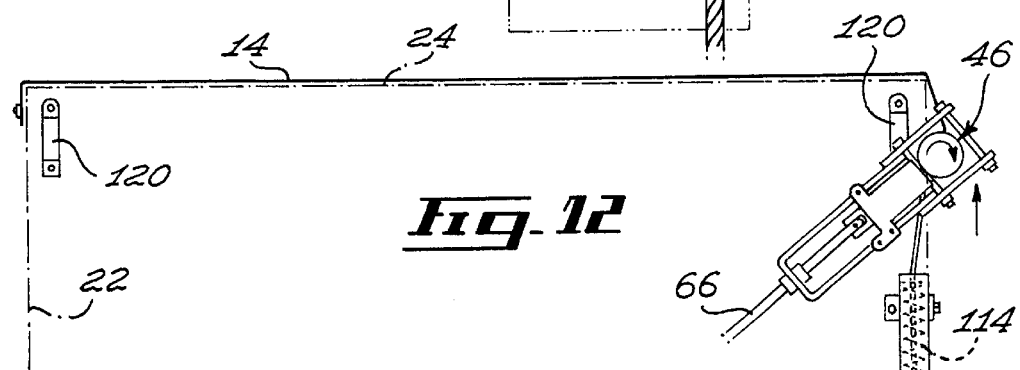
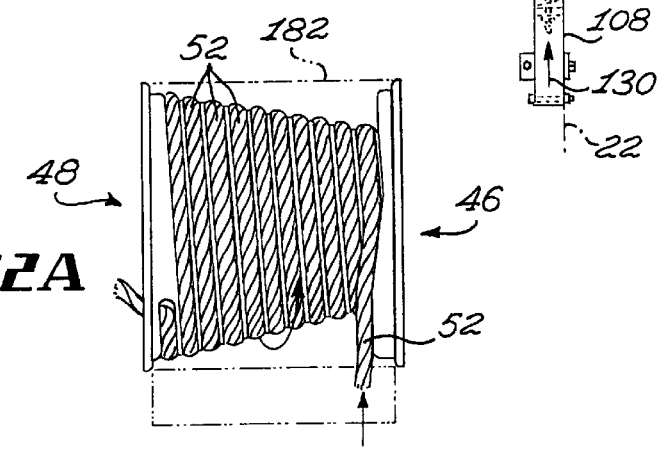

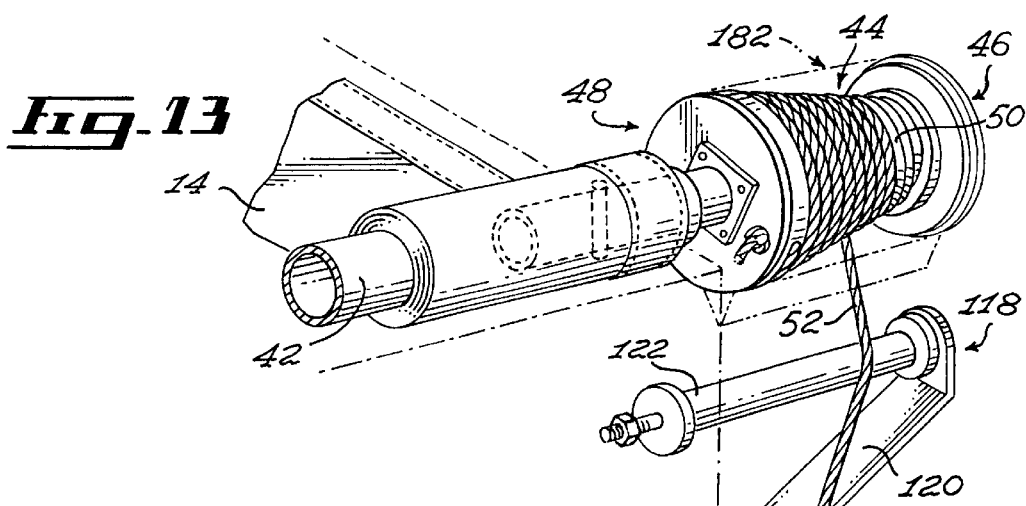
Fig. 13
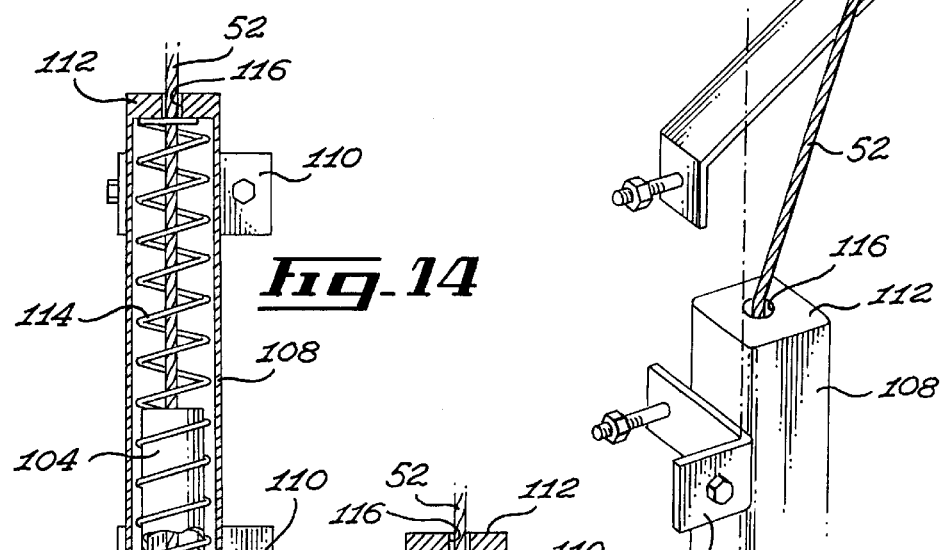
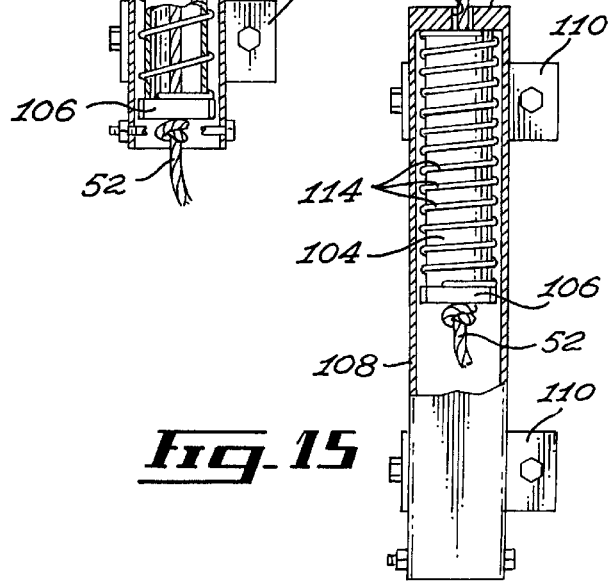
Fig. 14
Fig. 15
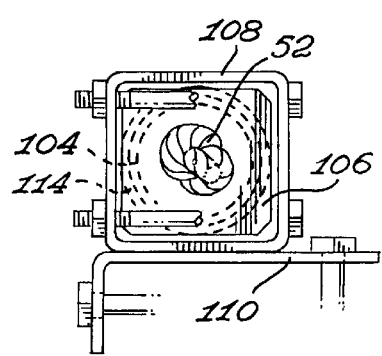
Fig. 16

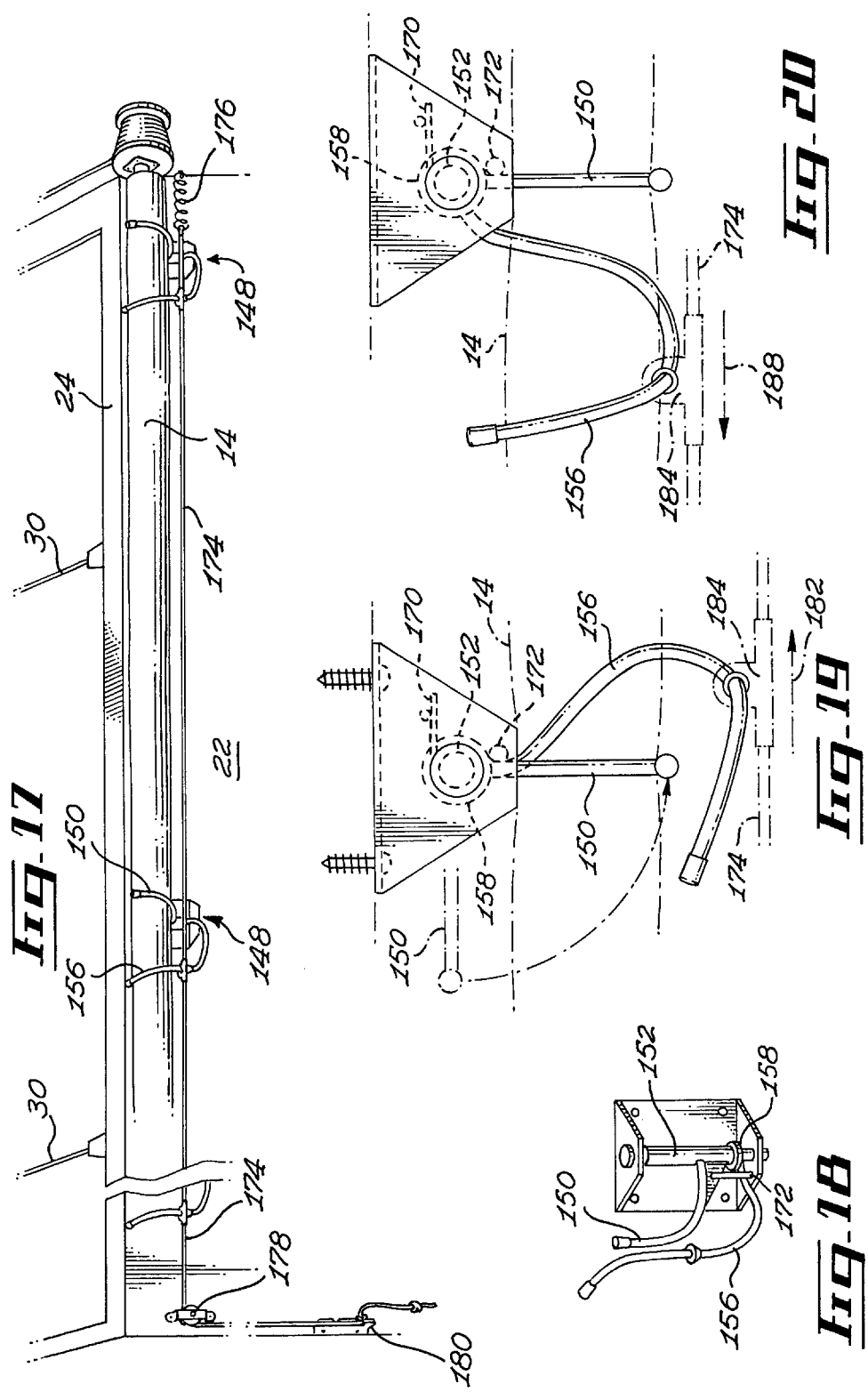

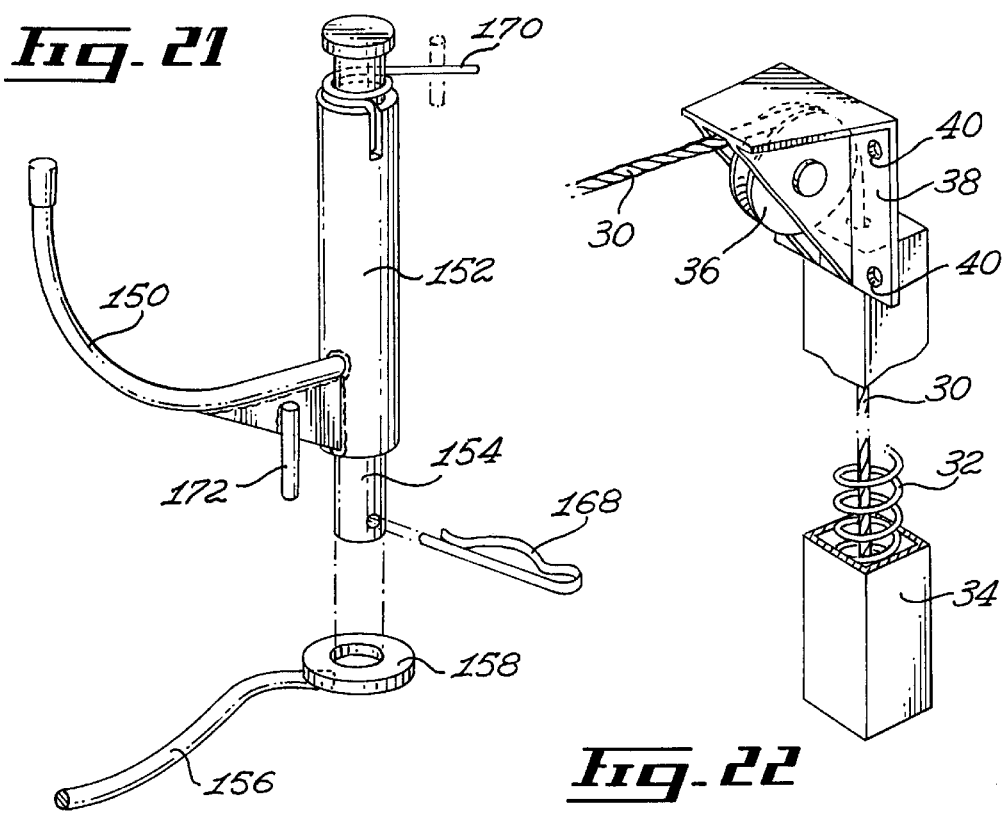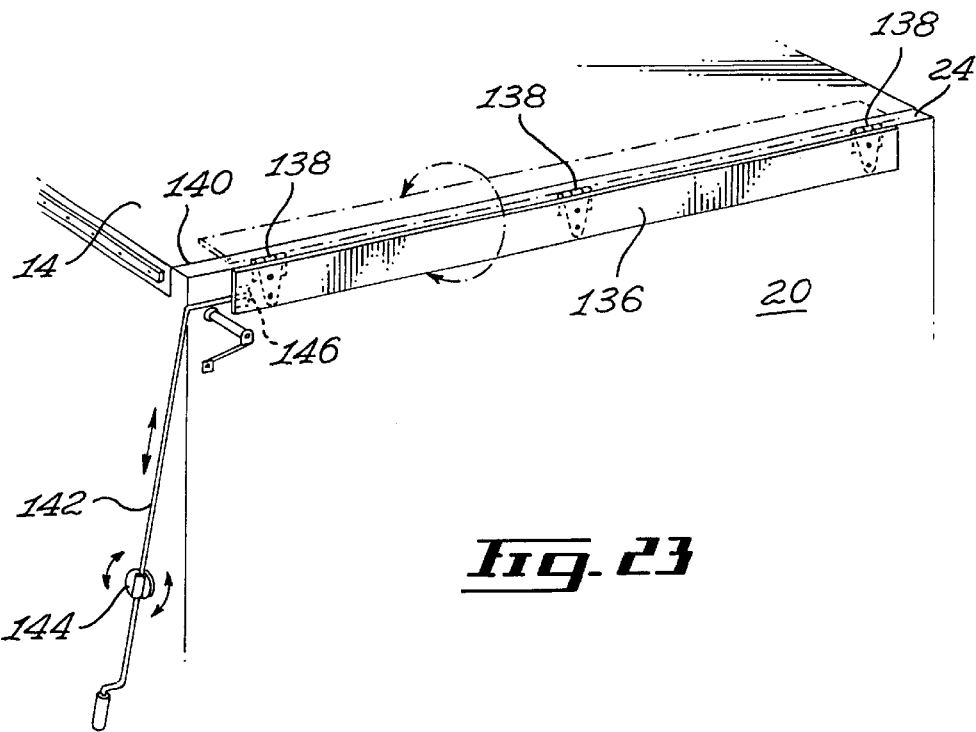

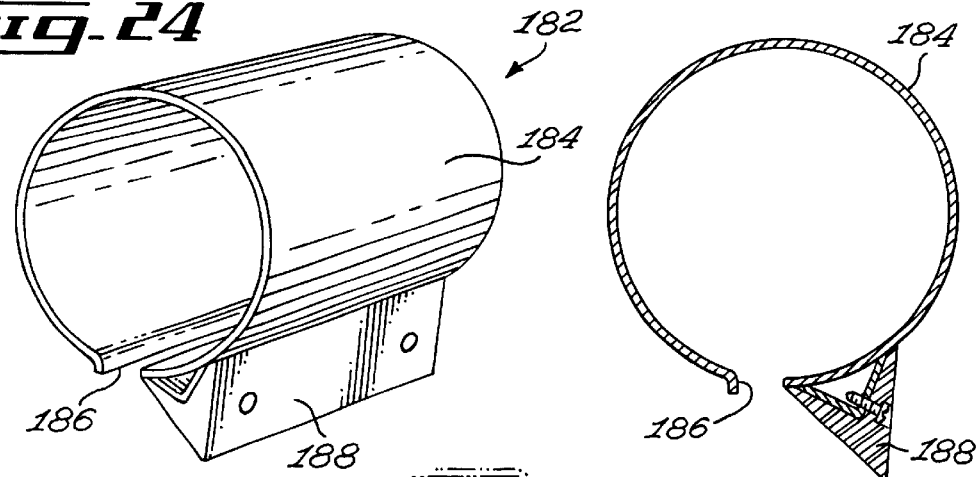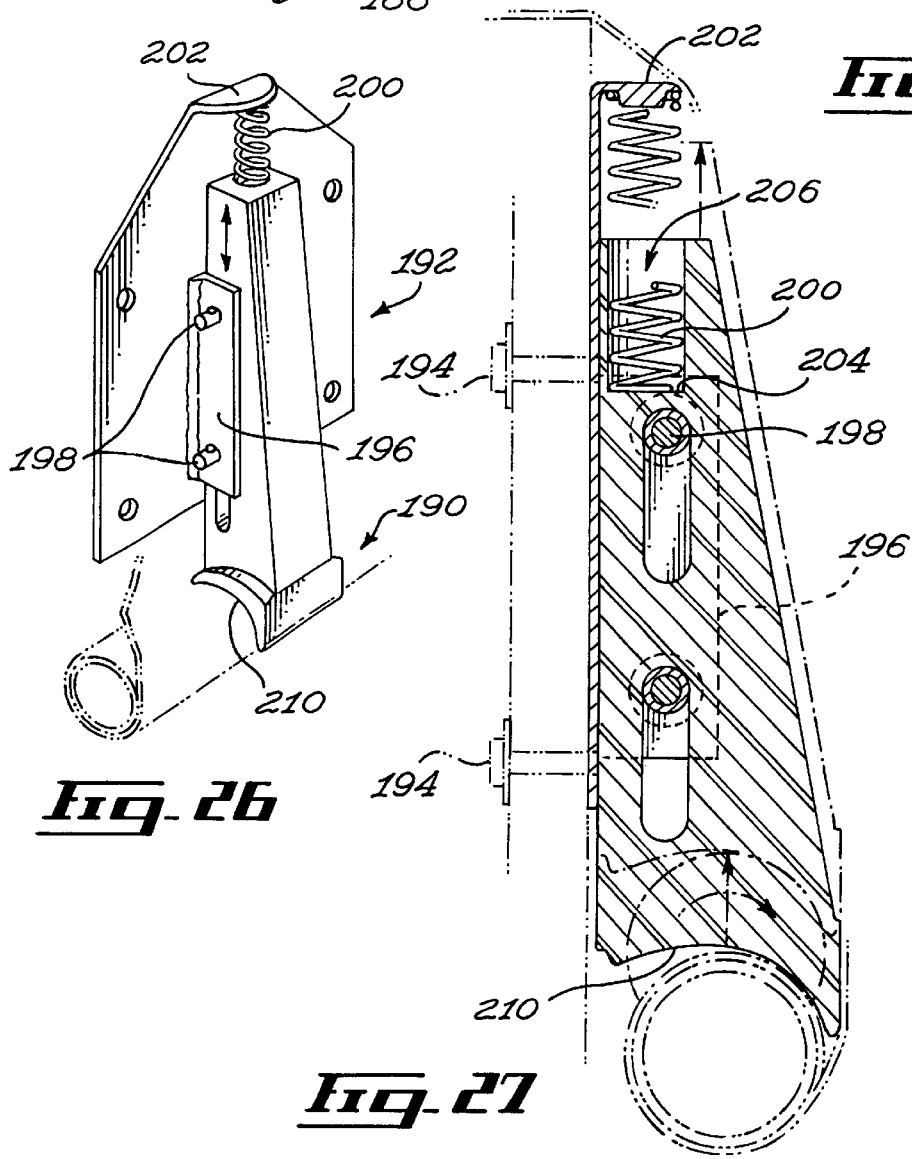

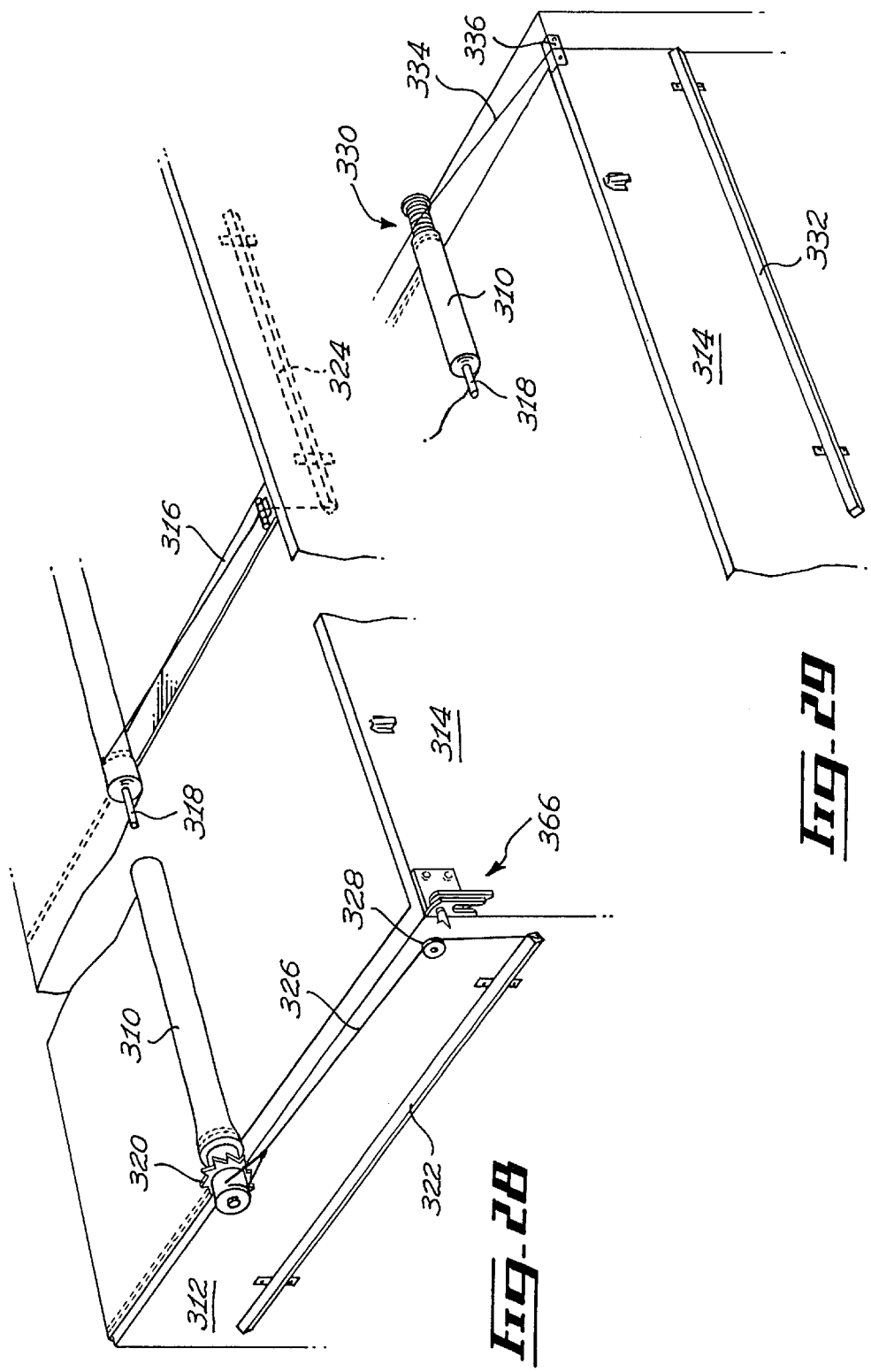

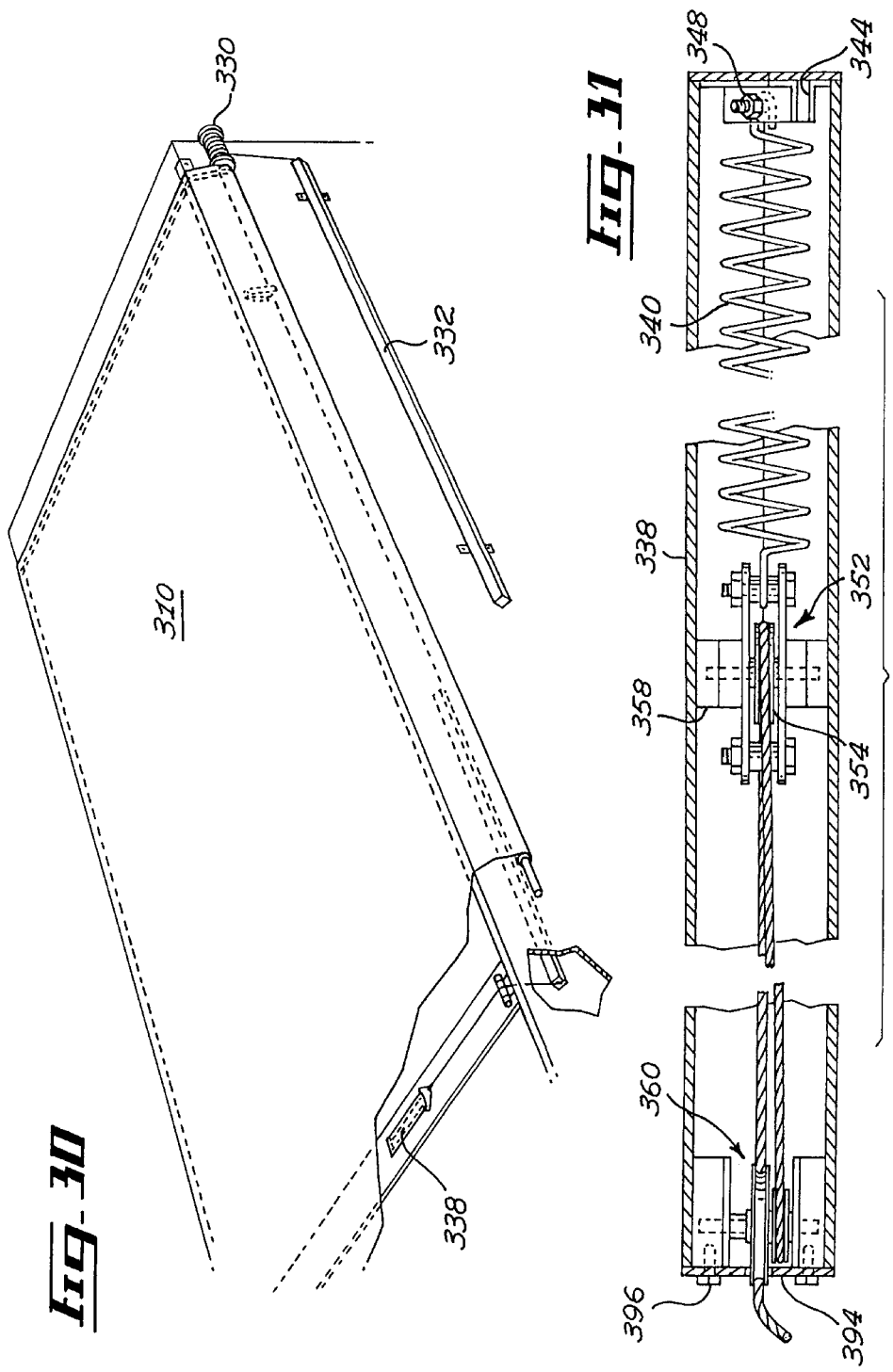

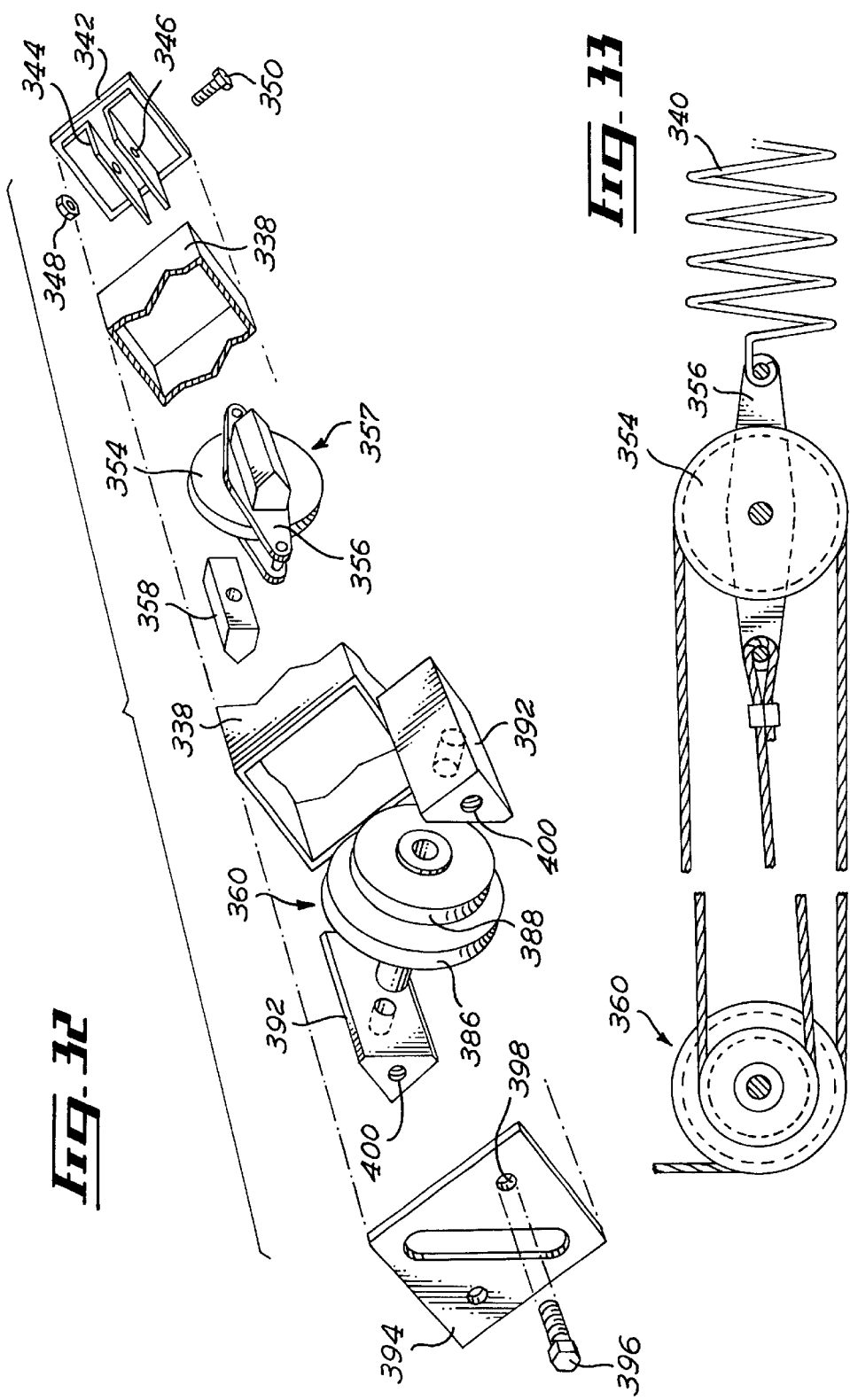

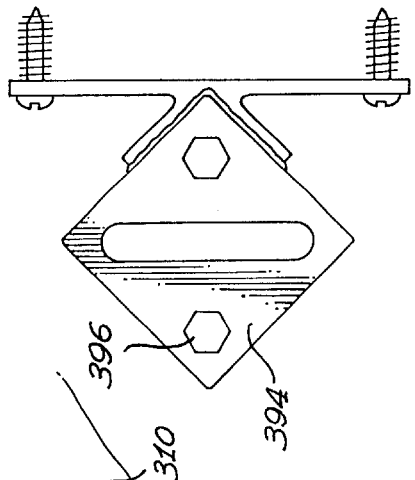
Fig. 36
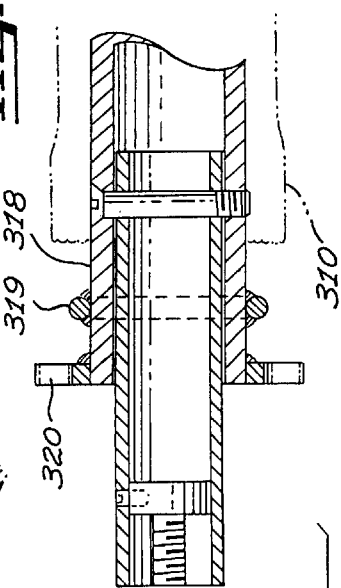
Fig. 35
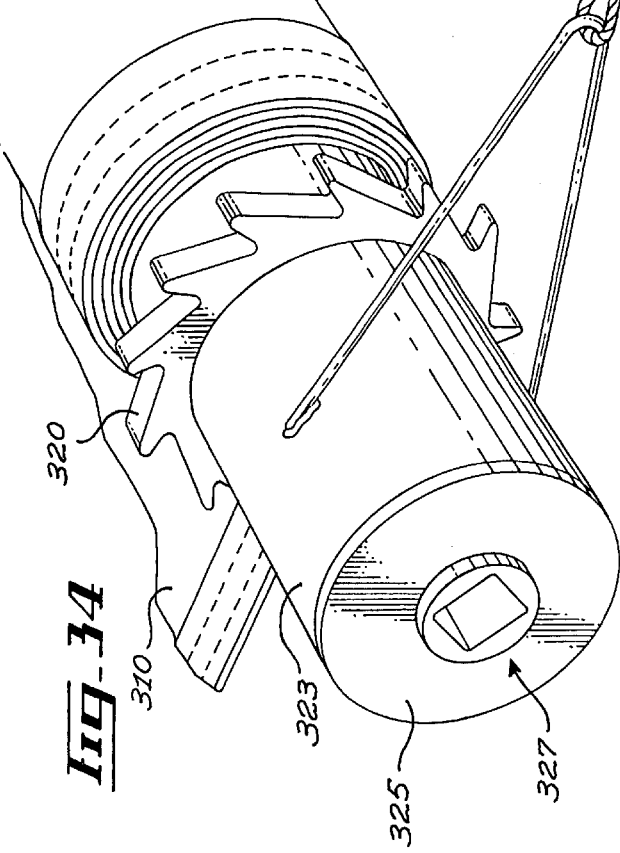
Fig. 34
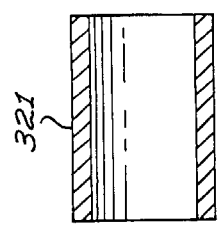
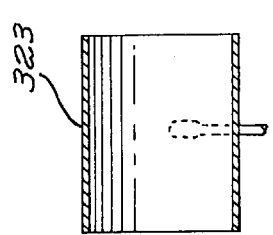
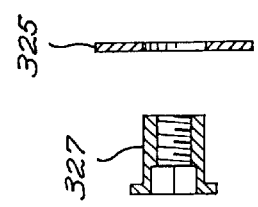

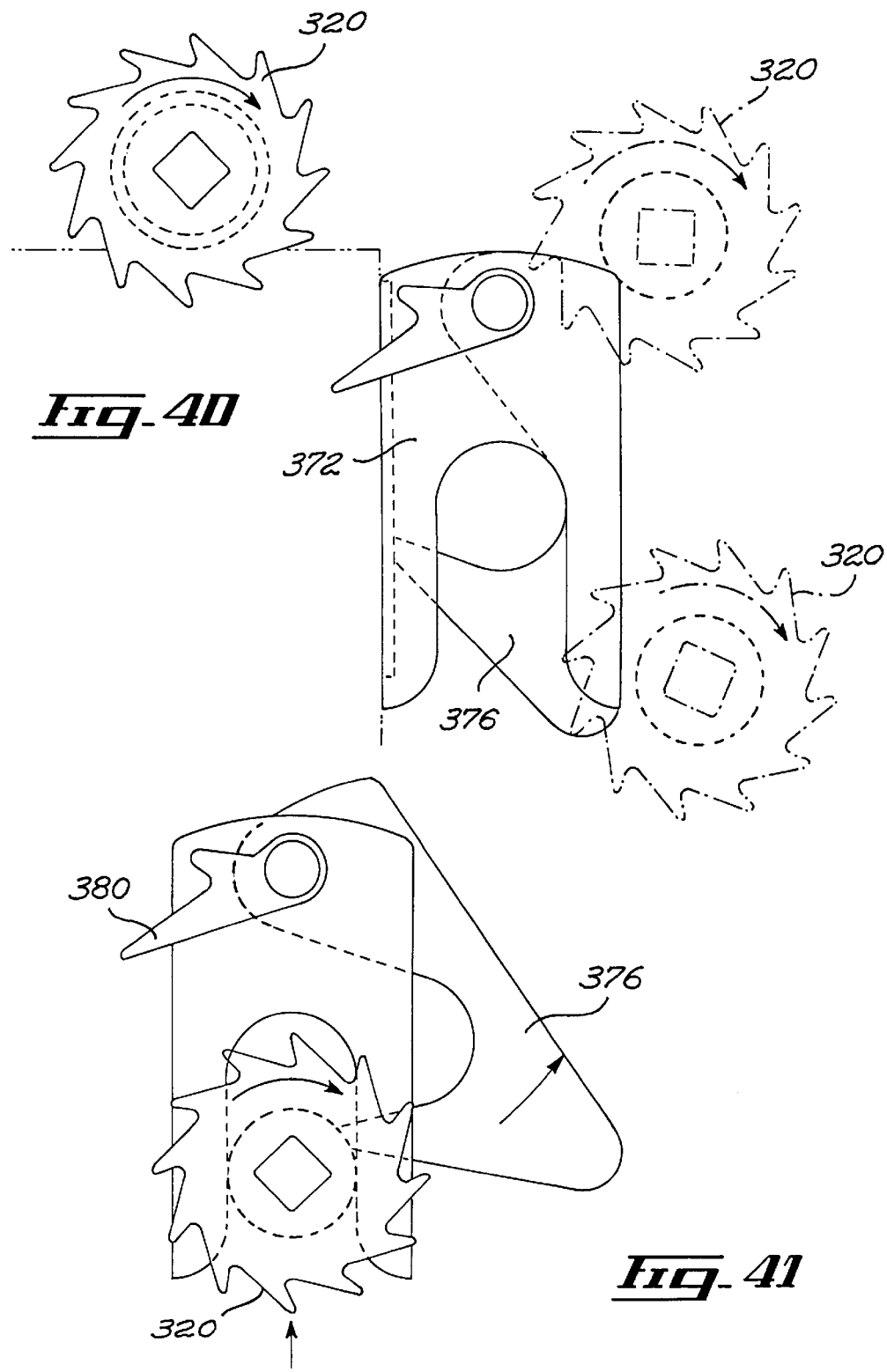

ASSEMBLY FOR COVERING OPEN TOP CONTAINERS

This application is a Continuation-in Part of U.S. application Ser. No. 09/878,368 filed Jun. 12, 2001 now abandoned and claims the benefit of provisional application No. 60/211,205, filed Jun. 13, 2000.

FIELD OF THE INVENTION

The present invention relates to the general field of open top containers and is particularly concerned with an assembly for selectively covering open top containers.

BACKGROUND OF THE INVENTION

Vehicle cargo containers for transporting bulk material such as sawdust, gravel chip, cutter shavings and the like typically include open top boxes such as semi-trailers or the like defining side walls, a front wall, a rear wall and a floor. These open top containers are typically mechanically coupled to various types of vehicles such as cargo ships, railway carts and truck cabins for transporting goods between various locations.

During transportation in these so-called open top containers, there exists a substantial risk that a portion of the load may be blown out of the open-top of the container it may potentially cause not only unnecessary wastage of the transported goods but may also create a dangerous situation. For example, when the open-top container is attached to a truck cabin, some of the load accidentally blown out of the container may contaminate the road or highway as it whirls around thus causing difficult ground road conditions. It may also be blown directly towards the windshield of following vehicles creating a potentially disastrous situation.

Accordingly, in many areas, regulations have been implemented for the carriage of various loads, particularly on public highways requiring that open-top containers be provided with some type of covering structure for covering the loading aperture during transport. With the increasing number of accidents, these official requirements have become more and more astringent, sometimes requiring adequate coverage for the load on even short journeys.

Consequently, there has been an industry wide move to provide permanently installed flexible covers often referred to as tarpaulins or tarps that can be quickly rolled and unrolled by the driver so as to allow selective covering and uncovering of the load. When these permanently installed tarpaulins are used only occasionally they may be stored on the vehicle in a folded condition and unfolded over the body as and when required.

Various configurations of tarpaulins have been proposed. However, two configurations have proven to be particularly popular. One such configuration is the so called end-rolled tarpaulin which is gathered at one of the longitudinal ends of the container when not in use and moved along the body of the container between operative and stored positions. The end-rolled tarpaulins are typically gathered at the front end of the vehicle and are usually provided along their length with a number of transverse supporting bars which extend between the two longer side walls of the container. The end-rolled tarpaulins are typically moved by means of a pair of cables trained over pulleys and carrying the tarpaulins with them as they move.

The other type of permanently installed tarpaulin preferred by some hauliers is referred to as the side-rolled tarpaulin. These so called side-rolled tarpaulins which permanently extends the full length of the container body are rolled and unrolled about a roll rod that also extends the full length of the container body.

The use of prior art flexible closures such as prior art tarpaulins to close or cover the loading aperture of open top containers is associated with a number of drawbacks. One major shortcoming related to prior art assembles involves the difficulty often encountered in drawing the flexible closures into a proper extended or closed configuration. Indeed, the relatively heavy, bulky and flexible nature of large tarpaulins often cause such closures to be quite difficult to draw into properly extended or closed position for service as cover. The wind, rain and other environmental factors such as the presence of snow and ice often contribute to the difficulty that is encountered in moving tarpaulins into position. Therefore, due to the size of the box and of the tarpaulin such arrangements often requires the operator to stand in the container or to climb upon the load to perform the covering and uncovering operations. More specifically, the operator must often climb upon the load to connect and disconnect the separate parts involved and this is clearly undesirable since it is both time consuming and potentially dangerous.

Also, the rotatable rod on which the tarpaulin is rolled is typically rotated in one direction to roll the tarpaulin up and therefore open the open top of the cargo container. It is rotated in the opposite direction to unroll the tarpaulin and close the open top of the cargo container. Manual rotation is generally through a hand-crank. Such rotation, when performed with prior art assemblies, is often considered both tedious and unergonomical.

Another main drawback associated with prior art assemblies relates to the difficulty in keeping the tarpaulin taut during the rolling and unrolling operations which leads to, potential damage to the involved structures. This situation also leads to difficulties in establishing a suitable weather resistant seals about the perimeters of properly extended closures. The difficulty in keeping proper tension on the tarpaulin during rolling and unrolling operations is compounded in certain situations as for example when there exists a relatively moderate or high wind causing the tarpaulin to catch in the wind. In such instances, it is sometimes necessary to face the truck trailer in such a manner that the wind will not catch the tarpaulin. This may prove to be impossible when the wind changes direction. The difficulty in maintaining the tarpaulin in a taut state during rolling and unrolling operations leads to possible ripping or tearing of the tarpaulin and associated structures.

The difficulty in maintaining the tarpaulin in a taut state during rolling and unrolling operations also potentially leads to an improper seal which, in turn, may lead to potentially dangerous road condition and loss of material. This problem has been addressed by some of the prior art structures. However, most prior art structures or assemblies lack an effective means of maintaining the cover taut and in place during transportation especially at highway speeds. Indeed, the investment of time and effort that typically must be extended to properly secure a prior art tarpaulin to prevent its being drawn out of proper position by environmental conditions often proves to be unwieldy. Some prior art assemblies make use of a series of straps spaced along the tarpaulin which are secured to the container side wall by tying or clamping. These prior art assemblies have proven to be unsatisfactory since they have demonstrated a tendency to admit dust or rain under the tarpaulin and to allow the bulk material to flow between the peripheral edges of the tarpaulin and of the container. Also, at highway speeds, the tarpaulin is subject to billowing.

Another drawback associated with prior art structures relates to the difficulty in protectively storing the flexible tarpaulins after they have been retracted or withdrawn from their extended or closed position. This difficulty is directly related to the heavy, bulky and flexible nature of the large tarpaulins once they are in their rolled configuration.

A further problem associated with prior art structures for storing flexible tarpaulins is the lack of an arrangement which will prevent accidental movement of the tarpaulin., In other words, the lack of a locking structure or braking structure to hold the rolled or unrolled tarpaulin in a desired position is a problem which is not dealt with by many commercially available devices.

A still further problem associated with prior art tarpaulin closure systems is the need for the arrangement for maintaining adequate tautness in the tarpaulin and to ensure that the central tube remains parallel to the side walls. In this respect, it has been proposed in U.S. Pat. No. 5,002,328 to provide a system wherein the cable for winding or unwinding the tarpaulin uses a winch drum which is of a frustro-conical configuration.

Accordingly, there exists a need for an improved assembly or assembly for covering open top containers.

SUMMARY OF THE INVENTION

Advantages of the present invention include that the proposed assembly and method is specifically designed so as to facilitate drawing flexible closures such as conventional tarpaulins into proper extended or closed position by maintaining. Also, through the use of a specifically designed mechanism, the tarpaulin is maintained in a relatively taut condition throughout the movements thereof between the extended and closed position. Also, the proposed assembly facilitates and optimizes securing the flexible closures once they have been properly extended or closed. The established securement allows suitable weather resistant seals above the perimeters of the properly extended or closed closures.

Furthermore, the proposed assembly is specifically adapted to protectively store the flexible closures after they have been retracted or withdrawn from their extended or closed position. The manipulation of the tarpaulin is facilitated by specifically designed ergonomic characteristics which are inherently built into the proposed assembly. The proposed assembly includes a component adapted to facilitate ergonomical rolling and unrolling of the tarpaulin. The same component may also act as a brake when needed to selectively prevent unrolling of the tarpaulin. The proposed assembly is also designed so as to be economical to manufacture, durable in use and efficient in operation.

In accordance with an embodiment of the invention, there is provided an assembly for selectively rolling and unrolling a generally rectangular tarpaulin so as to correspondingly uncover and tautly cover a top opening of an open-topped container, the open-topped container having opposite first and second container end walls and opposite first and second container side walls, the tarpaulin being configured and sized so as to be able to fit in a covering relationship over the top opening, the tarpaulin defining corresponding first and second tarpaulin side edges and first and second tarpaulin end edges, the tarpaulin being secured adjacent the first tarpaulin side edge to the first container side wall, the assembly comprising: a rolling rod having a generally elongated configuration defining a rod longitudinal axis and a pair of opposed rod longitudinal ends, the rolling rod being secured to the tarpaulin adjacent the second tarpaulin edge, the rolling rod being operatively mounted over the top opening to roll up the tarpaulin therearound so as to uncover the top opening when rotated about the rod longitudinal axis towards the first container side wall in a first rod rotational direction, the rolling rod being also operatively mounted over the top opening to unroll the tarpaulin so as to cover the top opening when rotated about the rod longitudinal axis towards the second container side wall in a second rod rotational direction; a tarpaulin tensioning means attached to both the open-topped container and the rolling rod for tensioning the tarpaulin while the tarpaulin is both rolled and unrolled onto and from the rolling rod; the tarpaulin tensioning means including a winch drum attached to the rolling rod adjacent one of the rod longitudinal ends so as to rotate solidarly therewith; a tensioning cable defining a tensioning cable first end and a tensioning cable second end, the tensioning cable first end being attached to the winch drum allowing the tensioning cable to be wound around the winch drum when the rolling rod is rotated in the second rod rotational direction and allowing the tensioning cable to be unwound from the which drum when the rolling rod is rotational direction; a cable tensioning means attached to the tensioning cable is second end for resiliency maintaining the tensioning cable taut state.

In one embodiment, the which drum has a generally frustro-conical configuration tapering from a larger proximal end located proximally relative to the open-topped container to a smaller distal end located distally relative to the open-topped container.

Conveniently, the winch drum is provided with a generally helicoidally-shaped winding groove formed on its external surface, the winding groove being configured and sized for substantially fitting receiving the tensioning cable.

Preferably, the winch drum is further provided with a locking flange positioned adjacent the distal end, the locking flange being provided with a locking protuberance extending inwardly and at an angle towards the window groove.

Conveniently, the cable tensioning means includes a cable attachment component attached to the tensioning cable second end; the cable attachment component being slidably mounted within a tensioning housing attached to the open-topped container, the tensioning housing defining a housing peripheral wall and a housing proximal wall.

As aforementioned, the winch drum may have a generally frustro-conical configuration tapering from a larger proximal end located proximally relative to the open-topped container to a smaller distal end located distally relative to the open-topped container; wherein the winch drum being provided with a generally helicoidally-shaped winding groove formed on its external surface, the winding groove being configured and sized for substantially fittingly receiving the tensioning cable; the winch drum being provided with a locking flange positioned adjacent the distal end, the locking flange being provided with a locking protuberance extending inwardly and at an angle towards the winding groove; the cable tensioning means including a cable attachment component attached to the tensioning cable second end; the cable attachment component being slidably mounted within a tensioning housing attached to the open-topped container, the tensioning housing defining a housing peripheral wall and a housing proximal end wall; a biasing means is mounted between the cable attachment component and the housing proximal end wall for resiliency biasing the cable attachment component away from the housing proximal wall; the tensioning housing being configured, sized and positioned so that when the cable attachment component abuttingly contacts the housing proximal end wall the tensioning cable is frictionally squeezed between the locking protuberance and the winding groove providing a releasable locking action that releasably prevents the winch drum from rotating.

However, in a further embodiment of the present invention, rather than utilizing the winch drum having a generally frustro-conical configuration, one may utilize a conventional winch drum having a uniform diameter. In this embodiment, one can provide a tensioning structure which is designed to equalize the tension. To this end, there may be provided a winch drum of a conventional configuration (one with a consistent core diameter) in conjunction with a pulley assembly, the pulley assembly being movable and being spring mounted to provide for tension equalization.

Preferably, the assembly further comprises a clamping plate pivotally mounted on the first container end wall adjacent the top opening so as to extend transversally thereacross, the clamping plate being pivotable between a clamp first configuration wherein it squeezes the first tarpaulin end edge between the clamping plate and the upper peripheral edge of the first container end edge and a clamp second configuration wherein it lies in a spaced relationship relative to the upper peripheral edge of the first container end edge.

Conveniently, the assembly further comprises a pivoting means for pivoting the clamping plate between the clamp first and second configurations, the pivoting means including a clamp handle extending from the clamping plate to a position located externally adjacent the open-topped container below the top opening.

Preferably, the assembly further comprises a nesting means for nestingly receiving the tarpaulin when the latter is in a fully roll-up configuration, the nesting means including at least two generally "L"-shaped nesting arms pivotally mounted adjacent an upper peripheral edge of the first container side wall, the nesting arms being pivotally mounted to as to pivot between a retracted configuration wherein they lie in a generally parallel relationship relative to the first container side wall and a protracted configuration wherein they lie in a generally perpendicular relationship relative to the first container side wall.

Conveniently, the assembly further comprises at least one locking leg pivotally mounted adjacent an upper peripheral edge of the first container side wall, the locking leg being pivotally mounted to as to pivot between a storage configuration wherein it lies in a generally parallel relationship relative to the first container side wall and a locking configuration wherein it lie in a generally angled relationship relative to the first container side wall and abuttingly contacts the tarpaulin when the latter is in a fully roll-up configuration, the locking leg being attached to a locking leg biasing means for biasing the locking leg towards the storage configuration, the locking leg biasing means ensuring a frictional contact between the locking leg and the tarpaulin when the tarpaulin is in a fully roll-up configuration and nested in the nesting means.

Preferably, the assembly further comprises an actuating mechanism for selectively either simultaneously pivoting both the at least two nesting arms towards the protracted configuration and the locking leg towards the locking configuration or allowing both the at least two actuating arms and the locking leg to pivot respectively towards the retracted and storage configuration.

Preferably, the assembly further comprises an abutment means for abutting against the rolling rod when the tarpaulin covers the top opening and the rolling rod is positioned alongside the second container side wall.

Preferably, the rolling rod is mechanically coupled to a drive means for rotating the rolling rod about the rod longitudinal axis in both the first and second rod directions.

Conveniently, the drive means includes a planetary set of gear mechanically coupled to the rolling rod so as to transfer the rotational movement of the rolling rod to a driven shaft extending in a generally perpendicular relationship relative to the rolling rod, the driven shaft being mechanically coupled to a driving shaft by a driving shaft-to-driven shaft coupling means allowing the driving shaft to be oriented at an angle relative to the driven shaft.

Preferably, the assembly further comprises a releasable shaft locking means coupled to the driven shaft for selectively preventing the rotation of the driven shaft. Conveniently, the assembly further comprises a clamping plate pivotally mounted on the, first container end wall adjacent the top opening so as to extend transversally thereacross, the clamping plate being pivotable between a clamp first configuration wherein it squeezes the first tarpaulin end edge between the clamping plate and the upper peripheral edge of the first container end edge and a clamp second configuration wherein it lies in a spaced relationship relative to the upper peripheral edge of the first container end edge; a nesting means for nestingly receiving the tarpaulin when the latter is in a filly roll-up configuration, the nesting means including at least two generally "L"-shaped nesting arms pivotally mounted adjacent an upper peripheral edge of the first container side wall, the nesting arms being pivotally mounted to as to pivot between a retracted configuration wherein they lie in a generally parallel relationship relative to the first container side wall and a protracted configuration wherein they lie in a generally perpendicular relationship relative to the first container side wall.

Preferably, the assembly further comprises at least one supporting cable extending between the first and second container sides walls, the supporting cable being positioned so as to support the tarpaulin when the latter covers the top opening. Preferably, the supporting cable is attached between the first and second container side walls by a resilient supporting cable attachment means allowing the supporting cable to resiliency deform upon supporting the tarpaulin.

BRIEF DESCRIPTION OF THE DRAWINGS

An embodiment of the present invention will now be disclosed, by way of example, in reference to the following drawings in which:

FIG. 1, in a perspective view, illustrates an assembly in accordance with an embodiment of the present invention for selectively covering open top containers, the assembly being shown mounted on an open top semi-trailer, the open top semi-trailer being shown in phantom lines and the assembly being shown in an extended or closed configuration;

FIG. 2, in a partial perspective view with sections taken out, illustrates the assembly shown in FIG. 1 mounted on the same semi-trailer but in an opened configuration;

FIG. 3, in a partial elevational side view with sections taken out, illustrates some of the components used for rolling and unrolling the tarpaulin, part of the assembly shown in FIGS. 1 and 2;

FIG. 4, in partial perspective view with sections taken out, illustrates the connection between the tarpaulin and a rolling rod;

FIG. 5, in a partial elevational view with sections taken out, illustrates part of the handling mechanism and its connection to the winding rod;

FIG. 6, in a perspective view, illustrates part of a braking mechanism used for selectively braking the winding mechanism;

FIG. 7, in a schematic cross sectional view with sections taken out, illustrates the locking mechanism in an unlocked configuration;

FIG. 8, in a schematic cross sectional view with sections taken out, illustrates the locking mechanism in a locked configuration;

FIG. 9, in a rear elevational view, illustrates part of the assembly shown in FIGS. 1 and 2 with the tarpaulin in an opened configuration.;

FIG. 9A, illustrates the winding coil part of the assembly and its relationship to the taut tensioning rope when the latter is in the open configuration;

FIG. 10, in a rear elevational view, illustrates part of the assembly shown in FIGS. 1 and 2 with the tarpaulin in an intermediate position;

FIG. 10A, illustrates the winding coil part of the assembly and its relationship to the taut tensioning rope when the latter is in an intermediate position;

FIG. 11, in a rear elevational view, illustrates part of the assembly shown in FIGS. 1 and 2 with the tarpaulin in a closed configuration;

FIG. 11A, illustrates the winding coil part of the assembly and its relationship to the taut tensioning rope when the latter is in a closed configuration;

FIG. 12, in a rear elevational view, illustrates part of the assembly shown in FIGS. 1 and 2 with the tarpaulin in a closed and locked configuration;

FIG. 12A, illustrates the winding coil part of the assembly and its relationship to the taut tensioning rope when the latter is in a closed and locked configuration;

FIG. 13, in a detailed perspective view with sections taken out, illustrates part of the coiling and locking mechanism;

FIG. 14, in a longitudinal cross-sectional view with sections taken out, illustrates the tensioning mechanism in an unlocked configuration;

FIG. 15, illustrates part of the tensioning mechanism shown in FIG. 14 in a locked configuration;

FIG. 16, in a bottom view, illustrates some of the components of the biasing mechanism shown in FIGS. 14 and 15;

FIG. 17, in a partial side elevational view with sections taken out, illustrates part of a storage mechanism used for storing the tarpaulin in a rolled up configuration;

FIG. 18, illustrates one of the storing supports;

FIG. 19, illustrates one of the storing supports as it is being drawn to a supporting configuration;

FIG. 20, illustrates one of the storing supports as it is being drawn to a locking configuration;

FIG. 21, in a partial exploded view, illustrates some of the components part of the assembly shown in FIGS. 17 through 20;

FIG. 22, illustrates one of the components used for supporting the tarpaulin in an opened or deployed configuration;

FIG. 23, in a partial rear perspective view with sections taken out, illustrates a securing component being pivoted between two positions;

FIG. 24, in a perspective view illustrates a drum winch cover component part of the assembly in accordance with the present invention;

FIG. 25, in a transversal cross-sectional view illustrates the cross-sectional configuration of the drum winch cover shown in FIG. 24;

FIG. 26, in a perspective view illustrates an abutment component for abutting against a rolling bar when the tarpaulin is extended over the top opening of the container;

FIG. 27, in a transversal cross-sectional view illustrates in greater details the abutment component shown in FIG. 26;

FIG. 28 is a partial perspective view of a further arrangement of a tensioning mechanism, the view illustrating an end and a middle portion thereof;

FIG. 29 is a partial perspective view of an opposite end of the tensioning arrangement of FIG. 28;

FIG. 30 is a perspective view similar to FIG. 29 illustrating movement of the tarpaulin;

FIG. 31 is a sectional view through the tensioner;

FIG. 32 is an exploded view thereof with the cable and spring being removed;

FIG. 33 is a partial elevational view thereof;

FIG. 34 is a partial perspective view of an end of a tarpaulin roll;

FIG. 35 is an exploded view showing the components illustrated in FIG. 34;

FIG. 36 is a side view showing the attachment of the tensioning device;

FIGS. 40, 41 and 42 are side elevational views illustrating operation of the locking device.

DESCRIPTION OF THE PREFERRED EMBODIMENTS

Figure 37:
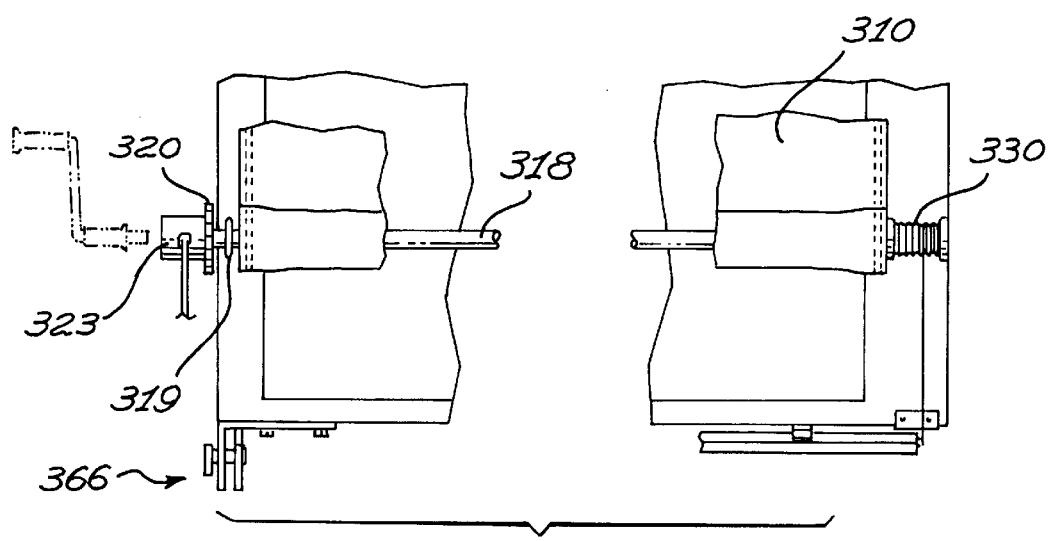
FIG. 37 is a plan view illustrating operation of the tensioning device.
Figures 38, 39:
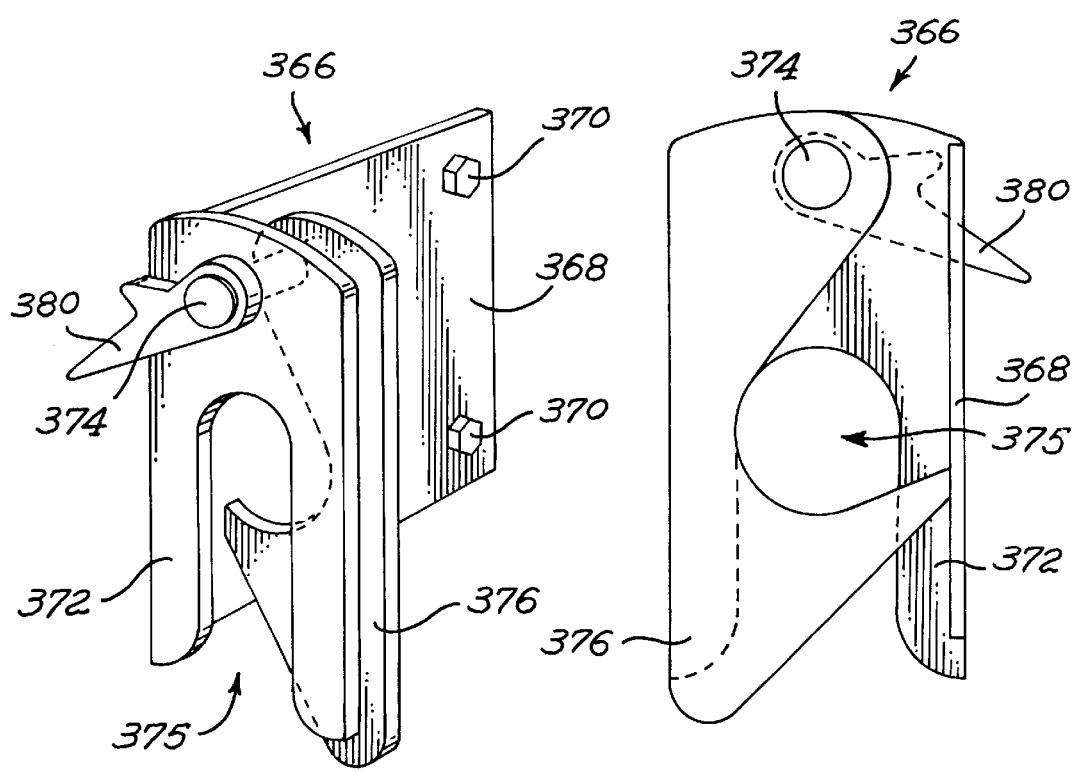
FIG. 38 is a front perspective view of a locking mechanism used with the tensioning device.
FIG. 39 is a rear elevational view of the locking device of FIG. 38.

Referring to FIG. 1, there is shown an assembly 10 for covering open-topped containers in accordance with an embodiment of the present invention. The assembly 10 is shown mounted on an opened top container represented by a conventional semi-trailer type of open-topped container 12 shown in phantom lines. It should be understood that the assembly 10 could be used in other contexts such as with open-topped railway cars, open-topped cargo containers and the like without departing from the scope of the present invention. The assembly 10 includes a sheet of relatively flexible material commonly referred to as a tarpaulin 14 that can be made out of a continuous interval piece of material or made up of sections as shown in FIG. 1, that are assembled together at junctions which are sewn together using connecting segments 16.

When the assembly 10 is used in the context of semi-trailers, the latter define a rear end wall 18, a front end wall 20 and a pair of opposed side walls 22. The rear end wall 18, the front end wall 20 and the side walls 22 together define a container upper peripheral edge 24 which delimits the top opening leading into the container volume 26. Reinforcement ribs 28, typically extend between the side walls 22 in a generally perpendicularly relationship relative thereto, in order to maintain the side walls 22 in a substantially parallel relationship relative to each other regardless of the load positioned within the container volume 26. The reinforcement ribs or struts 28 are typically a form of elongated, hollow tubular extensions of aluminum alloy.

The present invention proposes the use of supporting cables 30 also extending between the side walls 22. The supporting cables 30 are provided for supporting and distributing the weight of the tarpaulin 14 when the latter covers the top opening of the open-topped container 12. As illustrated more specifically in FIG. 22, the supporting cables 30 are preferably attached to side walls 22 using a resilient attachment means allowing the cables 30 to resiliency deform upon the loaded exhorted thereon exceeding a predetermined limit.

The resilient supporting means preferably includes a biasing means such as an helicoidal type spring 32 mounted within a spring protective casing 34. The spring protective casing 34 is, in turn, mounted to the inner surface of the side walls 22. The cable 30 is partially wound around a supporting cable pulley 36 and re-directed thereby from a direction substantially perpendicular to the side walls 22 to a direction substantially parallel therewith.

The pulley 36 is rotatably mounted on a pulley mounting structure 38 affixed to the inner surface of the side walls 22 by a suitable fastening means such as bolts, screws or the like extending through mounting apertures 40. The longitudinal ends of the cable 30 are attached to the distal ends of the springs 32 that maintain the cable 30 in a taut state while allowing resilient deformation thereof.

The assembly 10 includes a means for selectively rolling and unrolling the tarpaulin 14 between respective opened and closed configurations shown respectively in FIGS. 2 and 1. Referring now more specifically to FIG. 3, there is shown in greater details some of the components used for rolling and unrolling the tarpaulin 14. At least one of the longitudinal edges of the tarpaulin 14, preferably a longitudinal edge in the case of a side rolled tarpaulin, is solidly anchored to a rolling rod 42 preferably having a generally cylindrical cross section configuration. The rolling rod 42 defines a rod longitudinal axis and opposed rod longitudinal ends. The longitudinal end of the tarpaulin 14 is preferably anchored to the rolling rod 42 using anchoring plates 44 having fastening means such as screws, rivets or the like 46 extending through corresponding apertures formed in the plates 44 and the rolling rod 42 as shown in FIG. 4.

A winch drum 44 is attached at one and preferably both longitudinal ends of the rolling rod 42. The winch drums 44 illustrated in greater details in FIGS. 9A through 12A, preferably has a generally frustro-conical configuration so as to define a distal drum end 46 having a generally smaller external diameter than an opposed drum proximal drum 48 having a generally larger external diameter.

The winding section of the winch drums 44 is provided with an helicoidally-shaped winding groove 50 formed on the external surface thereof for substantially fittingly receiving a tensioning cable 52. The winch drum 44 is further provided with a locking flange 45 positioned adjacent its distal end. The locking flange 45 is provided with a tapering locking protuberance 47 extending inwardly and at an angle towards the winding groove 40.

At least one of the winding drums 44 is releasably mechanically coupled by a coupling pin 54 to a planetary type of beveled gear assembly 56, including at least a pair of beveled gears 58, mechanically coupled to each other in a substantially perpendicular relationship relative to one another. The planetary type of gear assembly 56 is protectively, at least partially enclosed, within a corresponding gear frame including a pair of frame plates 60 assembled together and maintained in a predetermined spaced relationship relative to each other by plate bolts 62.

The proximal planetary type gear 58 is mechanically coupled to a driven shaft 64 extending integrally therefrom. The driven shaft 64 extends from the gear frame and is mechanically coupled to a driving shaft 66 by a universal type of pivotal link 68. The driving shaft 66, in turn, extends integrally into a handle section 70 forming a crank adapted to be ergonomically used by the intended user.

The drive mechanism formed by the crank 70, the driving shaft 66 and the driven shaft 64 is provided with a reversible locking means for reversibly preventing rotation of the crank handle 70 and the corresponding rotation of the rolling rod 42. The reversible braking means is illustrated in greater details in FIGS. 5 through 8. The reversible braking means includes a brake frame 72 preferably formed as an integral piece of tubing 74 bent so as to form a generally "U" shaped configuration. The frame tubing 74 is pivotally attached by a mounting sleeve 76 to a pivotal rod 78 extending between opposite frame plates 60.

A locking plate 80 is solidly attached about a peripheral edge thereof to the sleeve 76. A locking block 82 having gear teeth 84 extending outwardly therefrom is mounted on an inner surface of the locking plate 80. The locking gear teeth 84 are configured and sized for mechanical coupling to a locking gear disc 86 having corresponding locking teeth 88 mounted on the exterior portion of the driven shaft 64. A resilient locking plate damping means is preferably provided for allowing dampened connection between the locking gear teeth 84 and 88. The damping means preferably includes damping blocks 90 extending between the frame tubing 74 and the plate 80, the damping blocks 90 being formed out of a substantially resilient material such as a piece of elastomeric material. An helicoidal type spring 92 or other suitable resiliency deformable component also extends between the frame tubing 74 and the plate 80 for limiting the relative movement therebetween.

In use, the releasable locking means is adapted to selectively prevent rotation of the rolling rods 42 by preventing selective rotation of the driven rod 64. In order to prevent rotation of the driven rod 64 about its longitudinal axis, the driving shaft 66 and the crank handle 70 extending integrally therefrom are pivoted to a position substantially parallel to the side walls 22 of the open-topped container and generally perpendicular to the rolling rods 42.

In this locked configuration shown in FIG. 3, the locking teeth 84 extending from the locking block 82 mounted on the locking plate 80 are slidably inserted in corresponding spacings formed between the locking teeth 88 of the locking disc 86 mounted on the protruding section of the driven shaft 64 thus preventing rotation thereof. When the rolling rod 42 needs to be rotated in either direction as indicated by arrows 94 in FIG. 5, the driving shaft 66 and associated crank handle 70 extending therefrom are pivoted according to arrow 96 in FIG. 5 towards an angled relationship relative to the side walls 22 and to the driven shaft 64.

The pivotal movement of the driving shaft 60 is transmitted to a linkage sleeve 98 connecting the frame rod 74 to the driving shaft 66. The linkage sleeve 98 slides on the driving shaft 66 according to arrow 100 and allows the locking teeth 84 to be retracted from the spacing between the locking teeth 88 thus allowing free rotation of the locking, disc 86 and corresponding driven shaft 64 to which it is solidly attached through a pin 102.

The universal-type connection 68 allows simultaneous pivotal movement according to arrow 96 and rotational movement of the driving and driven shafts 66, 64 about their respective longitudinal axis. The configuration of the driving unit thus allows an intended user to position the crank handle 70 at a suitable angle for ergonomical manipulation thereof.

One of the main feature of the present invention resides in the capacity of the assembly 10 to maintain the tarpaulin sheet 14 in a substantially taut state during rolling and unrolling thereof about the rolling rod 42. This feature is accomplished through the use of both the tensioning cable 30 and a cable tensioning means attached to the tensioning cable. The tensioning cable 30 defines a tensioning cable first end and a tensioning cable second end. The tensioning cable first end is attached to the winch drum 44 allowing the tensioning cable to be wound around the winch drum 44 when the tarpaulin 14 is being unrolled from the rolling rod 42 and allowing the tensioning cable 30 to be unwounded from the winch drum 44 when the tarpaulin 14 is being rolled on the rolling rod 42. The cable tensioning means is attached to the tensioning cable second end for resiliency maintaining the tensioning cable in a cable taut state. The cable tensioning means for maintaining the cable in a suitable tensioned state is illustrated more specifically in FIGS. 13 through 16.

The cable tensioning means includes a cable attachment component 104 having a generally cylindrical configuration. The cable attachment component 104 is provided with a cable anchoring wall 106 for attachment of one of the distal ends of the tensioning cable 52. The cable attachment component 104 is slidably mounted within a tensioning housing 108 attached to the exterior surface of the container by suitable mounting brackets 110.

A biasing means for biasing the cable connecting component 104 towards an initial spaced relationship relative to a proximal end wall 112 of the tensioning housing 108 is further provided. The biasing means preferably takes the form of an helicoidal-type spring 114 abutting at a first longitudinal end thereof against the inner surface of the proximal end wall 112 at an opposed longitudinal end thereof against the cable attachment wall 106 so that the helicoidal type spring 114 works in a resilient compressive mode.

The tensioning cable 52 extends through a cable aperture 116 formed in the proximal wall 112 and is maintained in a proper spaced relationship relative to the exterior surface of the container by a cable spacing means 118 attached thereto. The cable spacing means 118 preferably includes a spacing arm 120 extending generally outwardly at an angle from the front and rear inner walls 20, 18 and a spacing roller 122 rotatably attached to the exterior surface of the container and to an attachment section of the spacing leg 120. The tensioning cable 52 is thus maintained in a predetermined spaced relationship relative to the container without undue friction that could lead to deterioration thereof.

Use of the means for keeping the tarpaulin 14 in a substantially taut state during rolling and unrolling thereof about the rolling rod 42 is shown schematically in FIGS. 9 through 12. In FIG. 9, the tarpaulin 14 is fully wound around the rolling rod 42 and the rolled tarpaulin is nested within a retractable storage assembly shown in FIGS. 17 through 21 that will be disclosed in greater details hereinafter. As can be seen in FIG. 9A, in such a rolled state, the tensioning cable 52 is nested within the largest winding grooves 50 located adjacent the larger proximal end 48 of the winch drums 44.

In order to unwind the tarpaulin 14 from the rolled rod 42 and extend the tarpaulin 14 across the open-topped of the container between the side walls 22, an intended user merely needs to rotate the crank handle 70 as indicated by arrow 124 in FIG. 10. The rotation of the crank handle 70 not only causes rotation of the rolling rod 42 as indicated by arrow 124 but also imparts rotation to the winch drums 44 attached thereto.

As indicated by arrow 128 in FIG. 10A, this, in turn, causes the tensioning cable 52 to wind about the winch drum 44 in the grooves 50 towards the distal end 46 thereof having a smaller external diameter. During both the winding and unwinding of the cable 52 and the winding and unwinding of the tarpaulin 14, the tensioning cable 52 and thus the tarpaulin 14 to which it is attached through the drive mechanism are maintained in a substantially taut state by the compressive action of the helicoidal type spring 114 within the tensioning chamber or cylinder 108.

The intended user continues to use the crank handle 70 until the tarpaulin 14 extends from one side wall 22 to the other as shown in FIG. 11. The use of a frustro-conical drum winch 44 and the angle of the tensioning cable 52 as it leaves the tensioning cylinder 108 and is redirected by the sleeve 122, creates a relatively uniform torque on the drum winch 44 regardless of the position of the rolling rod 42 relative to the first and second container side walls. Thus, an intended user may ergonomically exert a relatively constant torque on the crank handle to roll and/or unroll the tarpaulin 14 across the top opening.

Once the tarpaulin 14 extends between the side walls 22, continued rotation of the crank handle 70 causes the distal end of the tensioning cable 52 to pull on the cable attachment wall 106 of the cable attachment component 104 as indicated by arrow 130 in FIG. 12. Continued rotation of the crank handle 70 still further causes the tensioning cable 52 to wind about a distal-most locking groove 132 having a locking protrusion 47. The locking groove 132 is adapted to bias the tensioning cable 52 distally, hence increasing the winding diameter. The relatively large winding diameter, in turn, creates a length discrepancy between the tensioning cable 52 and the tarpaulin that tends to increase the pulling force on the tension spring 114.

Simultaneously, the cable attachment component 104 continues its ascension within the tensioning sleeve 108 until it reaches a position illustrated in FIG. 15 wherein abuttingly contacts the abutment wall 112. In this configuration, the compressive force exerted by the spring 114 in combination with the beveled protrusion 47 together cooperate to form a releasable locking means for maintaining the tarpaulin 14 in a releasably locked and fully unrolled configuration. The tensioning housing is configured, sized and positioned so that when the cable attachment component abuttingly contacts the housing proximal end wall 112 the tensioning cable 52 is frictionally squeezed between the locking protuberance 47 and the adjacent winding groove thus providing a releasable locking action that releasably prevents the winch drum from rotating. In this configuration, the tarpaulin is also in sealed-tight abutting contact with the upper peripheral edge 24 of the open-topped container.

In order to further reduce the risk of having the tarpaulin billowing in the wind, clamping plates 136 are pivotally mounted by suitable hinge means 138 to the upper peripheral edge 24 of both the front and rear walls 20, 18. The clamping plates 136 are configured and sized for squeezing the front and rear longitudinal edges 140 of the tarpaulin 14 against the upper peripheral edge 24 so as to prevent blown air from being directed underneath the tarpaulin 14 causing the latter to billow.

A pivoting means for pivoting the clamping plates 136 between a non-operational configuration shown in full lines and an operational configuration shown in phantom lines in FIG. 23 is further provided. The pivoting means preferably includes a pivoting handle 142 pivotally mounted by a suitable pivotal connection 144 to the side walls 22 of the container and by a rod-to-plate pivotal link 146 to the clamping plates 136.

FIGS. 17 through 21, illustrate a nesting assembly for receiving the tarpaulin 14 when the latter is rolled upon the rolling rods 42 in a fully opened configuration shown in FIG. 2. The nesting assembly includes a set of nesting units mounted about one of the side walls 22 adjacent an upper peripheral edge 24 thereof. Each nesting unit 148 includes a generally "L" shaped nesting arm 150 extending from the nesting sleeve 152. The nesting sleeve 152 is provided with a sleeve channel for substantially fittingly receiving a nesting rod 154 extending therethrough.

A locking leg 156 having a generally "S" shaped configuration is mounted through the use of a mounting ring 158 and a mounting clip 168 directly to the nesting rod 154 and allow to rotate freely about the longitudinal axis thereof. A biasing means for biasing the nesting leg 150 towards a generally proximate and parallel relationship relative to the side wall 22 is further provided. The biasing means preferably takes the form of a spring clip 170. An abutment rod 172 is attached to the nesting leg 150 and configured and sized for selective abutment against the locking leg 156.

The nesting cable 174 is attached at a first longitudinal end thereof to a tensioning component such as an helicoidal type spring 176 and to a nesting cable locking mechanism 180 at the opposed longitudinal end after having been re-directed by a nesting cable pulley 178 both attached to one of the side walls 22. In use, when the nesting mechanism is not in use, the legs 150 and 156 are biased towards a generally proximate and parallel relationship with the side walls 22 by the spring clip 170.

When the nesting cable 174 is pulled according to arrow 182 in FIG. 19, a linkage component 184 pulls on the locking leg 156 which abuttingly contacts the abutment pin 172 pulling the nesting leg 150 towards its operational configuration shown in FIG. 19 adapted to abuttingly nest the rolled tarpaulin 14. Release of the nesting cable 174 allows the biasing means 176 to bring the legs 150 and 156 towards the receiving configuration shown in FIG. 9. The cable 174 is then pulled according to arrow 186 in FIG. 20 to bring the locking leg 156 in abutting contact with the tarpaulin 14 locking the latter in its nested configuration in the nesting legs 150.

Referring to FIGS. 24 and 25, there is shown a winch drum cover 182 for protectively covering the winch drum 44 and protecting the latter against environmental factors such as rain, snow, dust or the like. The winch drum cover 182 defines a generally cylindrical covering section 184 having a longitudinal slot 186 extending thereacross. The winch drum cover 182 also includes a cover mounting block 188 attached to the outer surface of the covering section 184 for allowing securement of the winch drum cover 182 to an adjacent structure.

Referring to FIGS. 26 and 27, there is shown an abutment means for abutting against the rolling rod 42 when the tarpaulin 14 covers the top opening and the rolling rod 42 is positioned alongside the second container side wall. The abutment means includes an abutment block 190 slidably mounted to a mounting bracket 192 secured to the second container side wall by conventional fixing means such as screws 194. The mounting bracket 192 includes a pair of spaced apart and parallel bracket flanges 196 extending perpendicularly therefrom. At least one and preferably two guiding pins 198 extend between the bracket flanges 196. The guiding pins are slidably inserted within corresponding guiding slots formed in the abutment block 190.

A block biasing means for biasing the abutment block downwardly is also provided. The block biasing means typically includes an helicoidal-type spring 200 compressed between a spring flange 202 extending from the mounting bracket 192 and a base wall 204 part of a spring receiving cavity 206 formed in the abutment block 190. An abutment surface 210 is formed on the outer surface of the abutment block 190 opposite the spring receiving cavity 206. The abutment surface 210 is preferably given a generally arcuate configuration so as to conform to the rounded contour of the rolling rod 42. The abutment means is adapted to resiliency abutting against the rolling rod 42 when the tarpaulin 14 covers the top opening and the rolling rod 42 is positioned alongside the second container side wall, thus maintaining the tarpaulin 14 in a taut state and reducing the risks of damaging the latter.

Turning to the embodiments illustrated in FIGS. 28 to 43, there is illustrated portions of a trailer having a tarp 310 designed to cover the opening. The trailer includes a front wall 312 and side wall 314. The forward and center portions are illustrated in FIG. 28 while FIG. 29 illustrates the rear portion thereof.

As may be seen in FIG. 28, there is provided a support member 316 extending across between the side walls. A rolling rod 318 for the tarpaulin 310 is provided as previously illustrated. Mounted on rolling rod 318 at the front end thereof is a sprocket gear 320. As may be seen in FIG. 35, the rolling rod 318 has a ring member 319 mounted thereon for guide purposes. Also provided is a bearing 321 having a sleeve member 323 thereabout. A washer 325 is located at the end while a screw threaded member 327 is designed to engage with the interior of the rolling rod 318.

A first tensioner 322 is mounted on front wall 312 while a second tensioner 324 is mounted interiorly on side wall 314. A cable 326 is associated with tensioner 322. Mounted at the rear end of rolling rod 318 is a drum or spool 330. Spool 330, unlike the previously described spool, has a constant diameter.

A further tensioner 332 having cable 334 associated therewith is mounted on the rear end of side wall 314. A plastic member 336 is mounted thereon.

The tensioner construction is illustrated in FIGS. 31, 32 and 33 and reference will now be had thereto. Tensioner includes an outer housing 338 having a spring member 340 mounted interiorly thereof. One end of spring member 340 is mounted to an anchorage 342 which has a pair of ears 344, each having an aperture 346 therein. A nut 348 and bolt 350 are provided to secure one end of spring member 340 to anchorage member 342 as may be seen in FIGS. 31 and 33.

Mounted at the other end of spring member 340 is a pulley assembly generally designated by reference numeral 352 and which includes a pulley wheel 354. A pair of frame members 356 are provided on either side of pulley wheel 354 and mounted thereon are a pair of guides 358. Spring member 340 is mounted at one end of frame members 356.

A second pulley assembly generally designated by reference numeral 360 includes, as may be best seen in FIG. 32, a pulley having a first winding surface 386 and a smaller winding surface 388. Pulley 360 is mounted on a shaft 390 which is entrained in a pair of guides 392.

As may be seen in FIGS. 31 and 32, pulley assembly 360 is fixedly secured by means of an end plate 394. Bolts 396 pass through apertures 398 in end plate 394 and are screw threadedly engaged with screw threaded apertures 400 in guides 392.

As may be seen in FIG. 33, cable 334 is initially entrained about groove 386 of pulley 360 and then passes to pulley 354. It is then passed around pulley surface 388, before being connected to frame member 356 of pulley assembly 352.

In this arrangement, a tension is maintained on cable 334 due to the arrangement of spring 340 and its attachment to movable pulley assembly 352.

A retaining assembly 366 is mounted on side wall 314 as may be seen in FIG. 28 and reference will now be had thereto.

Retaining assembly 366 is best illustrated in FIGS. 37 to 43 and reference will now be had thereto.

Retaining assembly 366 includes a back plate 368 connected to side wall 314 by means of bolts 370. Extending outwardly from back plate 368 is a side plate 372 which is arranged to receive a shaft 374 extending therethrough. Side plate 372 has an inverted U-shaped opening 375 for reasons which will become apparent hereinbelow.

A hinged member 376 is attached to shaft 374 and is hingedly movable with respect thereto. Hinged member 376 includes a recess 378.

Also mounted on shaft 374 is a pawl 380.

Figure 42:
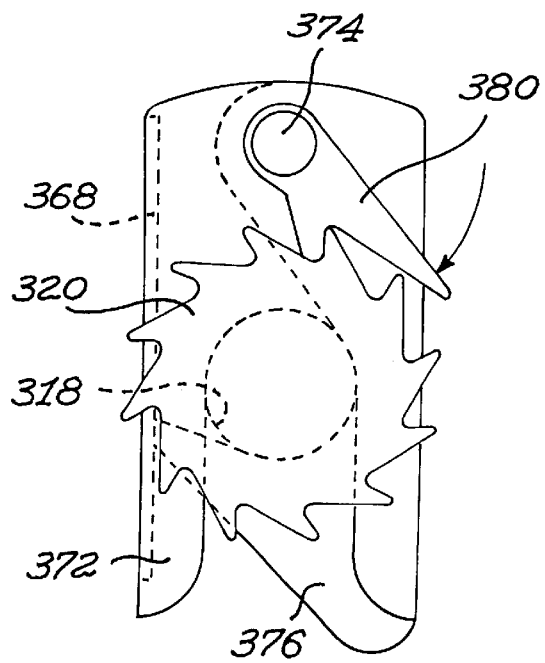
Figure 43:
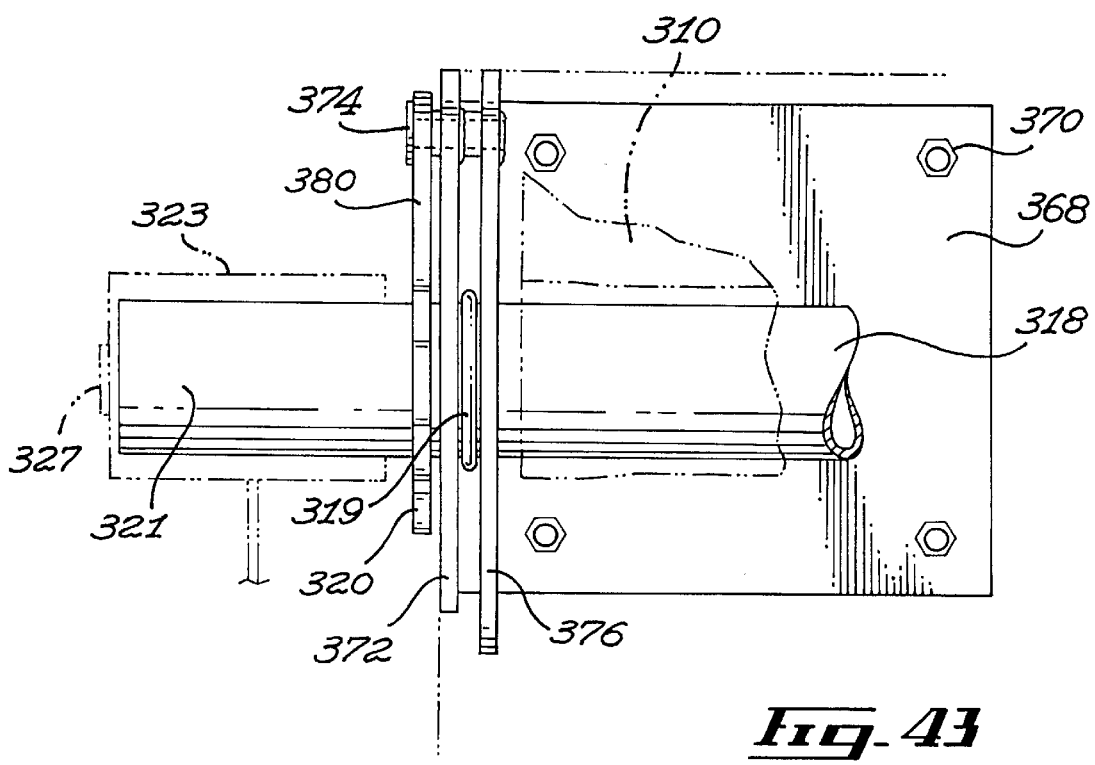
FIG. 43 is an elevational view thereof.

In operation, as seen in FIGS. 40 to 42, during the unrolling of the tarpaulin 310, rolling rod 318 moves along front wall 312. As it extends past front wall 312, and to the middle position shown in FIG. 40, it starts a downward descent to the lower position as seen in FIG. 40.

Finally, as it clears the lower part of side plate 72, the tension will cause the rolling rod 318 to move upwardly in U-shaped opening 375. Hinged member 376 moves outwardly as indicated by arrow 382 to the position shown in FIG. 41. Subsequently, and shown in FIG. 42, hinged member 376 will move back by force of gravity and rolling rod 318 is then securely held. Pawl 380 is moved downwardly to engage sprocket gear 20 and prevent further movement thereof.

It will be understood that the above described embodiments are for purposes of illustration only and that changes or modifications may be made thereto without departing from the spirit and scope of the invention.

I claim:

1. An assembly for selectively rolling and unrolling a generally rectangular tarpaulin so as to correspondingly uncover and tautly cover a top opening of an open-topped container, said open-topped container having opposite first and second container end walls and opposite first and second container side walls, said tarpaulin being configured and sized so as to be able to fit in a covering relationship over said top opening, said tarpaulin defining corresponding first and second tarpaulin side edges and first and second tarpaulin end edges, said tarpaulin being secured adjacent said first tarpaulin side edge to said first container side wall, said assembly comprising:

a rolling rod having a generally elongated configuration defining a rod longitudinal axis and a pair of opposed rod longitudinal ends, said rolling rod being secured to said tarpaulin adjacent said second tarpaulin edge, said rolling rod being operatively mounted over said top opening to roll up said tarpaulin therearound so as to uncover said top opening when rotated about said rod longitudinal axis towards said first container side wall in a first rod rotational direction, said rolling rod being also operatively mounted over said top opening to unroll said tarpaulin so as to cover said top opening when rotated about said rod longitudinal axis towards said second container side wall in a second rod rotational direction;

a tarpaulin tensioning means attached to both said open-topped container and said rolling rod for tensioning said tarpaulin while said tarpaulin is both rolled and unrolled onto and from said rolling rod; said tarpaulin tensioning means including:

a winch drum attached to said rolling rod adjacent one of said rod longitudinal ends so as to rotate therewith;

a tensioning cable defining a tensioning cable first end and a tensioning cable second end, said tensioning cable first end being attached to said winch drum allowing said tensioning cable to be wound around said winch drum when said rolling rod is rotated in said second rod rotational direction and allowing said tensioning cable to be unwound from said winch drum when said rolling rod is rotated in said first rod rotational direction;

a cable tensioning means attached to said tensioning cable second end for resiliently maintaining said tensioning cable in a cable taut state; and a retaining assembly, said retaining assembly having a recess for receiving said rolling rod when said tarpaulin is unrolled, and a locking means to prevent said rolling rod from exiting said recess.

2. The assembly as recited in claim 1 wherein said cable tensioning means includes a cable attachment component attached to said tensioning cable second end; said cable attachment component being slidably mounted within a tensioning housing attached to said open-topped container, said tensioning housing defining a housing peripheral wall and a housing proximal end wall; a biasing means is mounted between said cable attachment component and said housing proximal end wall for resiliency biasing said cable attachment component away from said housing proximal wall.

3. The assembly as recited in claim 1 further comprising a clamping plate pivotally mounted on said first container end wall adjacent said top opening so as to extend transversally thereacross, said clamping plate being pivotable between a clamp first configuration wherein it squeezes said first tarpaulin end edge between said clamping plate and the upper peripheral edge of said first container end edge and a clamp second configuration wherein it lies in a spaced relationship relative to said upper peripheral edge of said first container end edge.

4. The assembly as recited in claim 3 further comprising a pivoting means for pivoting said clamping plate between said clamp first and second configurations, said pivoting means including a clamp handle extending from said clamping plate to a position located externally adjacent said open-topped container below said top opening.

5. The assembly as recited in claim 1 further comprising a nesting means for nestingly receiving said tarpaulin when the latter is in a fully roll-up configuration, said nesting means including at least two generally "L"-shaped nesting arms pivotally mounted adjacent an upper peripheral edge of said first container side wall, said nesting arms being pivotally mounted to as to pivot between a retracted configuration wherein they lie in a generally parallel relationship relative to said first container side wall and a protracted configuration wherein they lie in a generally perpendicular relationship relative to said first container side wall.

6. The assembly as recited in claim 5 further comprising at least one locking leg pivotally mounted adjacent an upper peripheral edge of said first container side wall, said locking leg being pivotally mounted to as to pivot between a storage configuration wherein it lies in a generally parallel relationship relative to said first container side wall and a locking configuration wherein it lie in a generally angled relationship relative to said first container side wall and abuttingly contacts said tarpaulin when the latter is in a fully roll-up configuration, said locking leg being attached to a locking leg biasing means for biasing said locking leg towards said storage configuration, said locking leg biasing means ensuring a frictional contact between said locking leg and said tarpaulin when said tarpaulin is in a fully roll-up configuration and nested in said nesting means.

7. The assembly as recited in claim 6 further comprising an actuating mechanism for selectively either simultaneously pivoting both said at least two nesting arms towards said protracted configuration and said locking leg towards said locking configuration or allowing both said at least two actuating arms and said locking leg to pivot respectively towards said retracted and storage configurations.

8. The assembly as recited in claim 1 further comprising an abutment means for abutting against said rolling rod when the said tarpaulin covers said top opening and said rolling rod is positioned alongside said second container side wall.

9. The assembly as recited in claim 1 wherein said rolling rod is mechanically coupled to a drive means for rotating said rolling rod about said rod longitudinal axis in both said first and second rod directions.

10. The assembly as recited in claim 9 wherein said drive means includes a planetary set of gear mechanically coupled to said rolling rod so as to transfer the rotational movement of said rolling rod to a driven shaft extending in a generally perpendicular relationship relative to said rolling rod, said driven shaft being mechanically coupled to a driving shaft by a driving shaft-to-driven shaft coupling means allowing said driving shaft to be oriented at an angle relative to said driven shaft.

11. The assembly as recited in claim 10 further comprising a releasable shaft locking means coupled to said driven shaft for selectively preventing the rotation of said driven shaft.

12. The assembly as recited in claim 1 wherein said cable tensioning means comprises a housing, first and second pulley means, a first one of said pulley means being fixedly secured to said housing, a biasing means connecting a second one of said pulley means to said housing such that said second pulley means is movable within said housing.

13. The assembly as recited in claim 12 wherein said biasing means comprises a coil spring interposed between said housing and said second one of said pulley means.

14. The assembly as recited in claim 13 further including a pair of guides secured to said second one of said pulley means to facilitate movement thereof within said housing.

15. The assembly as recited in claim 14 wherein said tensioning cable passes around said first pulley means to said second pulley means and then is further entrained about said first pulley means and secured to said second pulley means.

16. The assembly as recited in claim 1 further including a gear box having a first beveled gear operatively connected to said rolling rod, a second beveled gear connected to a driving shaft, a drive handle pivotally connected to said drive shaft, a gear wheel mounted on said driving shaft, and a brake assembly interconnected between said drive handle and said gear box such that when said drive handle is in a vertical position, said brake assembly engages said gear wheel to prevent rotation thereof, while when said drive handle is moved pivotally outwardly, said drive handle can drive said driving shaft.

17. The assembly as recited in claim 16 wherein said brake assembly is pivotally connected at one end thereof to said gear box, and is connected to said driving shaft at a second end thereof in a linearly movable manner.

18. The assembly as recited in claim 17 further including biasing means biasing said braking assembly towards said gear wheel.

* * * * *